(12) United States Patent
Han et al.

(10) Patent No.: US 7,895,502 B2
(45) Date of Patent: Feb. 22, 2011

(54) ERROR CONTROL CODING METHODS FOR MEMORIES WITH SUBLINE ACCESSES

(75) Inventors: Junsheng Han, LaJolla, CA (US); Luis A. Lastras-Montano, Cortlandt Manor, NY (US); Michael R. Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 11/619,929

(22) Filed: Jan. 4, 2007

(65) Prior Publication Data

US 2008/0168329 A1    Jul. 10, 2008

(51) Int. Cl.
 *G11C 29/00*    (2006.01)
(52) U.S. Cl. .................. 714/764; 714/758; 714/766
(58) Field of Classification Search ............. 714/763, 714/764, 766, 755, 758
See application file for complete search history.

(56) References Cited

U.S. PATENT DOCUMENTS

| | | | |
|---|---|---|---|
| 4,951,284 A * | 8/1990 | Abdel-Ghaffar et al. ..... | 714/761 |
| 6,275,965 B1 * | 8/2001 | Cox et al. ................. | 714/755 |
| 6,903,887 B2 | 6/2005 | Asano et al. | |
| 7,409,623 B2 * | 8/2008 | Baker et al. ............... | 714/763 |
| 7,512,864 B2 * | 3/2009 | Zeevi ........................ | 714/766 |
| 7,739,576 B2 * | 6/2010 | Radke ........................ | 714/758 |
| 2005/0058199 A1 * | 3/2005 | Zhao et al. ............ | 375/240.03 |
| 2007/0226592 A1 * | 9/2007 | Radke ....................... | 714/766 |

OTHER PUBLICATIONS

Wolf, On Codes Derivable From the Tensor Product of Check Matrices, IEEE Transactions on Information Theory, Apr. 1965, pp. 281-284.
Maucher et al. On the Equivalence of Generalized Concatenated Codes and Generalized Error Location Codes, IEEE Transactions on Information Theory, vol. 46, No. 2, Mar. 2000, pp. 642-649.
Mario A. de Boer, Almost MDS Codes, Designs, Codes and Cryptography, 9, pp. 143-155 (1996).
Yves Edel et al. Lengthening and the Gilbert-Varshamov Bound, IEEE Transactions on Information Theory, Vo. 43, No. 3, May 1997, pp. 991992.
Arvind M. Patel, Two-Level Coding for Error Control in Magnetic Disk Storage Products, IBM J. Res. Develop. vol. 33, No. 4, Jul. 1989, pp. 470-484.
Khaled A.S. Abdel-Ghaffar et al., Multilevel Error-Control Codes for Data Storage Channels, IEEE Transactions on Information Theory, vol. 37, No. 3, May 1991, pp. 735-741.
Hassner et al., Integrated Interleaving—A Novel ECC Architecture, IEEE Transactions on Magnetics, vol. 37, No. 2, Mar. 2001, pp. 773-775.
Cilincse Office Action.

* cited by examiner

*Primary Examiner*—Sam Rizk
(74) *Attorney, Agent, or Firm*—Whitham, Curtis, Christofferson & Cook, P.C.; Stephen C. Kaufman

(57) ABSTRACT

A two-level error control protocol detects errors on the subline level and corrects errors using the codeword for the entire line. This enables a system to read small pieces of coded data and check for errors before accepting them, and in case errors are detected, the whole codeword is read for error correction.

20 Claims, 5 Drawing Sheets

ERROR CONTROL CODING METHODS FOR MEMORIES WITH SUBLINE ACCESSES

BACKGROUND OF THE INVENTION

1. Field of the Invention

The present application generally relates to error control coding methods for computer memory systems and, more particularly, to accessing error-control coded data in pieces smaller than one line, yet maintaining a high level of reliability. Such a mode of operation will be called subline access, which has its name derived from computer memory systems, where a cache line has a fixed size of, say, 128 bytes for IBM systems. One motivation to consider such a mode of data access is to increase efficiency; e.g., to allow more concurrent accesses, to reduce contention, latency and to conserve power, albeit depending on the application, there may be many other reasons to consider such an option.

2. Background Description

Codes protect data against errors. FIG. 1 illustrates lines of data in computer memory where the shaded portions represent data and the open portions represent redundant symbols. For the purposes of our discussion, the lines of data are broken into sublines of data, and the redundant symbols are distributed amongst the sublines of data. When a line of data is read from memory, the combined redundant symbols are used to provide error detection/correction capabilities, thereby protecting the integrity of the data.

When we read a portion of a codeword, the idea is of course that small pieces of data shall still be protected with certain error detection/correction capabilities. A trivial "solution" to the problem is to have each subline by itself have enough error correction capability as required for the whole codeword in the worst case, as shown, for example, in FIG. 2. This certainly would work and also offers the most independence/concurrency among subline accesses, which may become important in certain cases, but in general is too wasteful in requiring a large overhead.

In FIG. 3, we illustrate a DIMM (dual in-line memory module) 10 that consists of 19 DRAM (dynamic random access memory) devices, sixteen DRAM devices d1-d16 storing data and three redundant DRAM devices r1-r3 storing redundant symbols, which operate in parallel. Each DRAM device in this figure has a total of eight I/O (input/output) pins which connect to the memory hub chip 12, which communicates with the memory controller 14 of the processor chip 16 over high speed communication channels 18, and every access to the DRAM results in reading or writing information sent through those eight I/O pins during a minimum of eight consecutive transfers. Those skilled in the art will recognize that the above is a minimum burst 8, ×8 DRAM device. An illustration of the transmission pattern of the DRAM device cited above can be found in FIG. 4. It is evident that during a read operation, sixteen of these DRAMs will provide a total of 128 bytes (further abbreviated 128 B, with a similar notation for other situations), which is the cache line that is commonly present on PowerPC® microprocessors manufactured by International Business Machines Corp. (IBM). The three DRAMs r1-r3 shown in FIG. 3 are employed to store redundancy symbols to protect the integrity of the information stored in the other sixteen DRAMs.

A standard [19,16] shortened Reed-Solomon code constructed on GF(256) may be used as follows. Assign one (byte) symbol to each individual DRAM transfer over its eight I/O channels. The code is applied across the nineteen DRAMs in parallel, and independently on each of the eight transfers. An illustration of this coding scheme can be found in FIG. 5. It is well known in the art that such a [19,16] shortened Reed-Solomon code has a minimum distance of four symbols and therefore it is capable of correcting any one chip and, at the same time, fully detecting the existence of a double chip error.

Now suppose that one desires to access information from the DIMM in a granularity of 64 B (sixty-four bytes), instead of 128 B. Since at the present time the most common cache line in PowerPC® microprocessors is 128 B, one may say that one desires to make 64 B subline accesses. Reference is made to FIG. 6, wherein like reference numerals designate like components of the memory system shown in FIG. 1. Due to the fact that these DRAM devices have a minimum burst length of eight, the natural way to accomplish this is to partition the sixteen DRAM devices that are supplying data into two groups, here designated as Group 1 and Group 2. In Group 1, the memory chips are designated as $c_{1,1}$-$c_{1,9}$, while in Group 2, the memory chips are designated as $c_{2,1}$-$c_{2,10}$. These two groups communicate with memory hub chip 12a which, in turn, communicates with the memory controller 16. It is worth noting that in the DDR3 (double data rate 3) generation of DRAM devices, the minimal burst length that is allowed is also eight. This illustrates that this constraint is in fact motivated from basic technology parameters.

Since the number of DRAM devices that are devoted to redundancy is odd (three in this example), we cannot distribute them evenly among the two groups. In this example, Group 1 retains one redundant DRAM, whereas group two is allocated two redundant DRAMs. Now, let us analyze the level of reliability that one obtains by using shortened Reed-Solomon codes applied independently on each of the groups. For Group 2, one may employ a [10,8] shortened Reed-Solomon code for each of the transfers of the group of DRAMs (as described above for the first setting discussed). This enables the system to correct any error that may arise from that group. On the other hand, Group 1, we can only use a [9,8] shortened Reed-Solomon code. It is well known in the art that this code can only detect single symbol errors, and therefore the reliability characteristics of the DRAM devices of Group 1 are such that a single chip error may be detected but not corrected. It is worth noting that using a [18,16] code on the Group 1 transfers by taking two DRAM transfers instead of one does not result in the desired effect of correcting a single chip error because there are potentially up to two errors, and the [18,16] code can only correct up to one error, that is, if 100% error correction is desired. Longer codes applied over larger fractions of a DRAM burst have similar inconveniences.

The above illustrates that accessing smaller amounts of data in a memory in some instances results in a loss of available reliability. In the case of 128 B granularity of access, there is single chip error correction and double error detection, whereas in the case of 64 B granularity of access, a simple application of independent codes results in one of the groups not being able to correct all single chip errors. This is not an artificial result of having selected an odd number for the total number of redundant chips. If one had chosen four chips total, then it is easy to see that the system with 128 B access granularity would be able to do double chip error corrections, whereas 64 B access granularity (with two redundant chips on each group) would only be able to do single chip error correction.

The phenomenon described above is further exacerbated as the desired unit of access becomes smaller. Taking again the example in which a total of four additional redundant chips are given, if the desired unit of access is 32 B, then only one chip is allocated for every 32 B group, and only single chip error detection is attained.

As a result of the discussion above, it is often the case that one chooses to access information in sufficiently large lines so that reliability is not an issue, which in turn is associated with a number of drawbacks. For example, in memories where concurrent requests can be serviced, it may be that fewer such requests can in principle be serviced due to the fact that the larger line results in more resources from the memory being in a busy state. Other drawbacks include increased power consumption, due to the activation of a larger number of resources in the memory, and/or an increased usage of the communication channels that connect the memory with the system that uses it. A recent trend in adding more processing cores in a processor chip strains the buses that connect the processor chip with its memory subsystem and in some instances the result is a trend to design memories with smaller access granularities, with the reliability drawbacks noted above.

The description of the issues above serves as a motivation for this invention, in which we disclose a memory augmented with special error control codes and read/write algorithms to improve upon the problem exposed. In order to maximize the scope of our invention, we also disclose novel error control methods that in some instances result in improved redundancy/reliability tradeoffs. We include a detailed description of the optimality properties that one in general may desire from codes for this application. We phrase our invention using the terminology "line/subline", where subline is the desired (smaller) common access granularity and line is the access granularity that is used during an error correction stage. The general aspect of the error control coding techniques that we use is that a two level coding structure is applied with a first level for the sublines permitting reliable subline accesses correcting and detecting possible errors up to a prescribed threshold, and then a second level permitting further correction of errors found. We note that in the future what we are currently calling a subline may be referred to as a line in microprocessors and what we call a line will necessitate a different terminology; for example "block of lines".

It is noted that in the related field of hard drive storage technology a number of inventions have been made that employ error control. The known inventions are listed and discussed below.

In U.S. Pat. No. 4,525,838 for "Multibyte Error Correcting System Involving A Two-Level Code Structure" by Arvind M. Patel and assigned to IBM, a method is disclosed whereby small data chunks are protected with a first level of code and then multiple such small data chunks are protected using a shared, second level of code. The motivation cited for the invention lies on that conventional coding techniques impose restrictions on the blocklength of the code coming from algebraic considerations of their construction. For example, when the Galois Field that is used to construct the code has cardinality q, it is known that Reed-Solomon codes have maximum blocklength q−1, and doubly extended Reed-Solomon codes only increase this blocklength by 2. In typical applications q=256, which in the storage application of Patel would in some instances lead to undesirable restrictions.

In U.S. Pat. No. 5,946,328 for "Method and Means for Efficient Error Detection and Correction in Long Byte Strings Using Integrated Interleaved Reed-Solomon Codewords" by Cox et. al. and assigned to IBM, a method is disclosed whereby a block composed with a plurality of interleaved codewords is such that one of the codewords is constructed through a certain logical sum of the other codewords. The procedure indicated is claimed to further enhance the reliability of the stored data above the reliability levels attained by the patent of Patel U.S. Pat. No. 4,525,838. We note that the error detection/correction procedure is applied to blocks of stored data. This is because the main motivation for this invention is not to provide individual access to codewords of the block but rather to provide for an integrated interleaving of the block that is more efficient that that provided by Patel.

In U.S. Pat. No. 6,275,965 for "Method and Apparatus for Efficient Error Detection and Correction in Long Byte Strings Using Generalized, Integrated Interleaving Reed-Solomon Codewords" by Cox et. al. and assigned to IBM, the earlier U.S. Pat. No. 5,946,328 is further augmented with the capability of multilple codewords within a block benefiting from the shared redundancy when their own redundancy is insufficient to correct errors.

In U.S. Pat. No. 6,903,887 for "Multiple Level (ML), Integrated Sector Format (ISF), Error Correction Code (ECC) Encoding and Decoding Processes for Data Storage or Communication Devices and Systems" by Asano et al. and assigned to IBM, the idea of an integrated interleave in a sector is further extended with multiple levels of code to cover integrated sectors. We note that a change in terminology as come into effect in this patent whereby what was previously called a block in earlier patents is now identified with a sector together with its redundant checkbytes, and a group of sectors is now called a block. Using the new terminology, a notable aspect of the invention in discussion is that the basic unit of access of this storage memory is a sector (typically 512 bytes), and not the block of sectors to which the shared redundancy is applied, which differs from the previous cited inventions. This feature creates an issue with writing individual sectors to the storage device, the main cited problem being that such individual sector write operations need to be preceded by a read operation that reads the other sectors participating in the overall block, followed by an encoding and writing of the entire block back to the storage. This is referred to as the "Read-Modify-Write" (RMW) problem and is highlighted as an undesirable problem that can potentially reduce the performance of hard disks. The Asano et al. patent addresses this problem through its multiple levels of coding whereby in some instances protection by higher levels is disabled but a certain level of reliability is maintained by the lower levels of coding (for example, by coding within the sector as discussed by earlier patents). Another aspect of the Asano et al. patent is that redundant check bytes computed for a block are computed using only certain summations of check bytes at the sector-level (as opposed to the actual data contents of sectors), which is cited as a key property that enables high performance drive performance by avoiding the need to have the entire sector data present during the check computations.

As we shall see, our invention's preferred embodiment is concerned with memories that are used as the first main level of storage in a computer system, although they are also applicable to microprocessor caches and other settings. As such, distinct considerations are of the essence. In one aspect of this invention beyond those already stated, our coding techniques enable a memory with the capacity of executing an efficient Read-Modify-Write operation. In another aspect of this invention, novel error control coding techniques are disclosed that have the desirable property that the minimum distance of the second level code can exceed twice the minimum distance of the first level code yet pay the smallest possible theoretical cost in terms of allocated redundant resources (the minimum distance of a code is a technical term that is often used to describe an important aspect of the error correction capacity of a code). In a third aspect of this invention, subline accesses are employed during common system operation but line accesses are employed during a process that is commonly known as "memory scrubbing", whereby a background system process periodically scans the memory to read and write back the contents, thereby preventing the accumulation of errors in the memory.

SUMMARY OF THE INVENTION

According to the present invention, we provide a two-level error control protocol, in which errors are detected on the subline level through private redundancy, and corrected using the overall redundancy for the entire line. For example, a system may normally read small pieces of coded data and only checks for errors before accepting them, and in case errors are detected, the whole codeword will be read for error correction. This makes a lot of sense for memory systems, for example, where errors are extremely rare and persistent errors are logged and usually serviced in a limited amount of time. In another similar example, the system may, upon detection of errors in a small piece of data, enter a more "cautious" mode with longer latency, when data is decoded only after a full codeword is received; and after detection of no errors for a certain amount of time, revert back to the more "aggressive" state to read data in subline mode. This would make sense for a communication link with distinctive "good" and "bad" states and strong temporal correlation.

One of our primary concerns is that of achieving the best tradeoff between "local" and "global" error control capabilities and the overall overhead (redundancy) of the code. For simplicity, we focus on random errors and guaranteed error correction, and therefore focus on minimum (Hamming) distances and algebraic constructions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
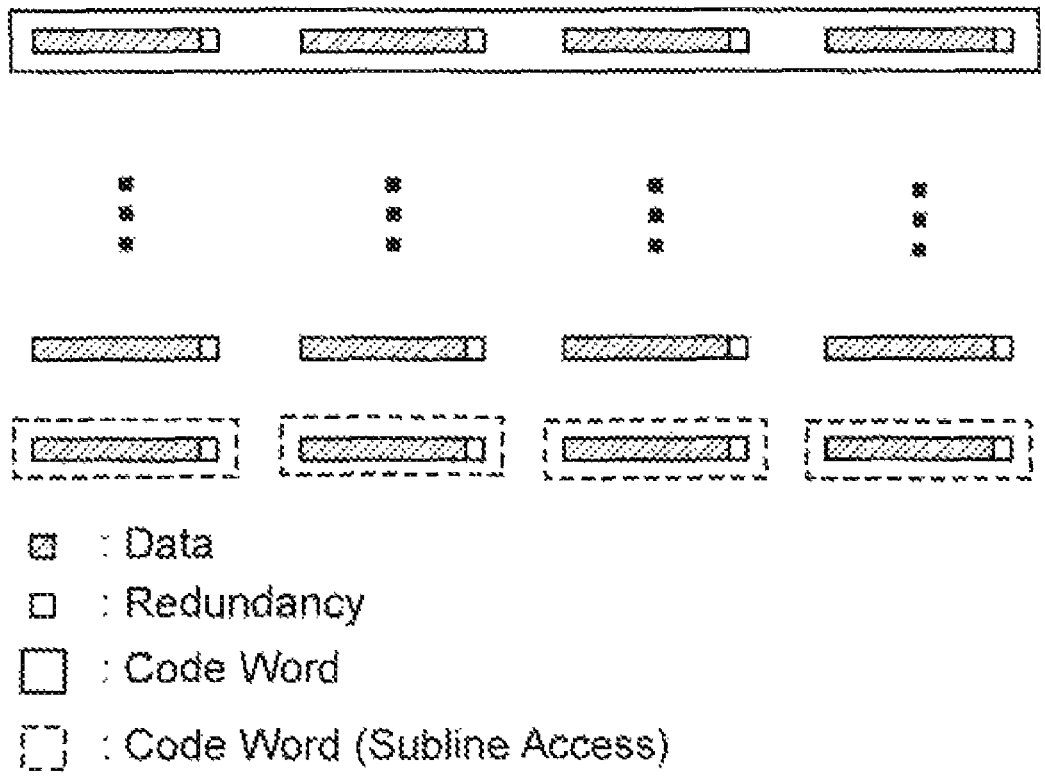
FIG. 1 is a diagrammatic representation of a memory chip showing lines of data and error detection/correction code words.
Figure 2:
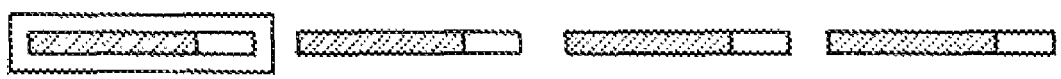
FIG. 2 is a diagrammatic representation of a line of data segmented into sublines with sufficient codewords for error detection/correction of each subline of data.
Figure 3:
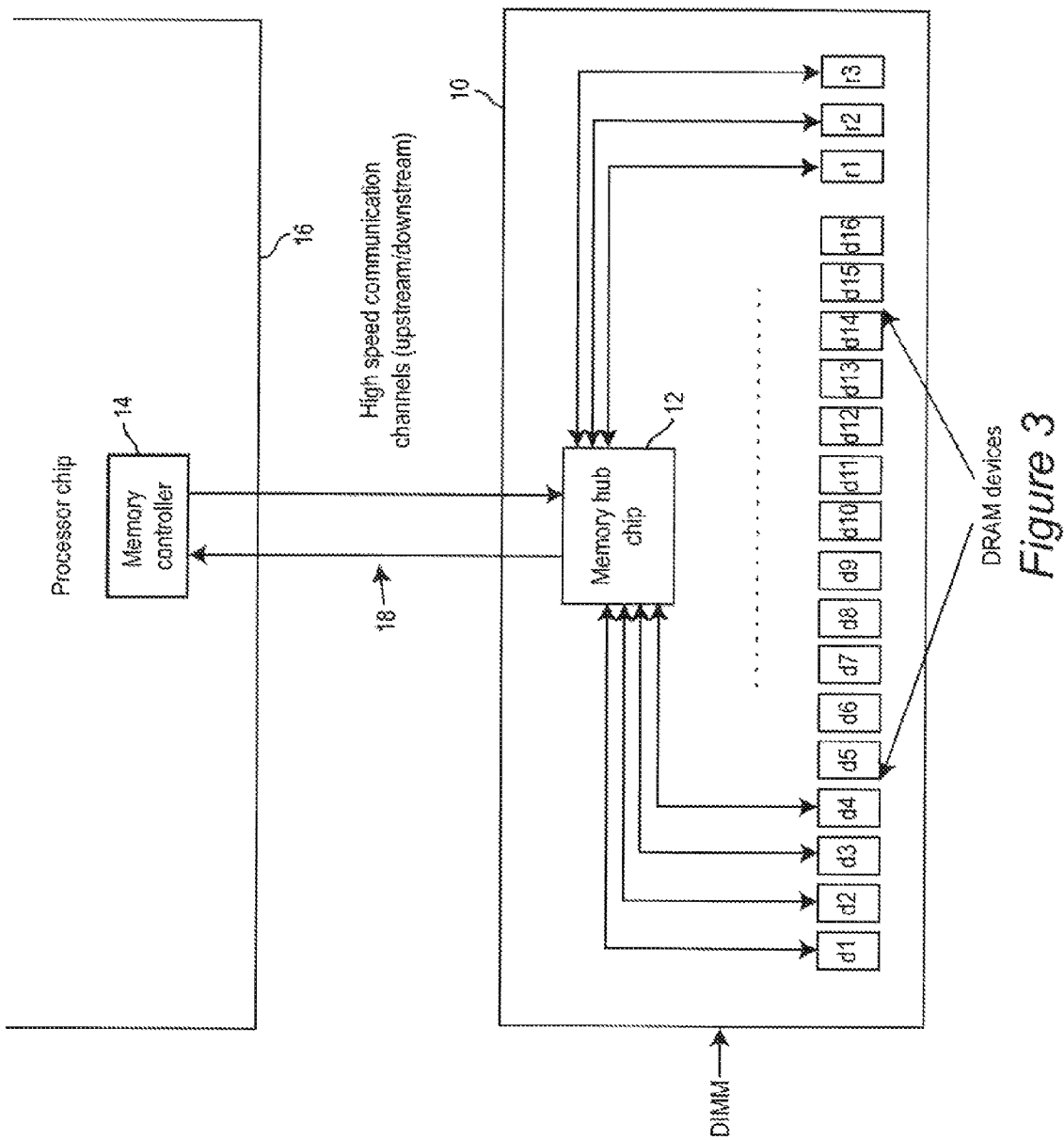
FIG. 3 is a block diagram of a memory system comprised of sixteen data DRAM devices and three redundant DRAM devices.
Figure 4:
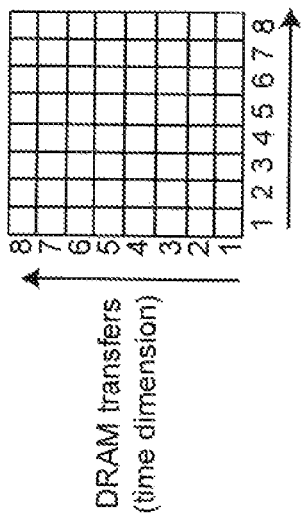
FIG. 4 is a schematic illustration of the output of a ×8, burst 8 DRAM during one access.
Figure 6:
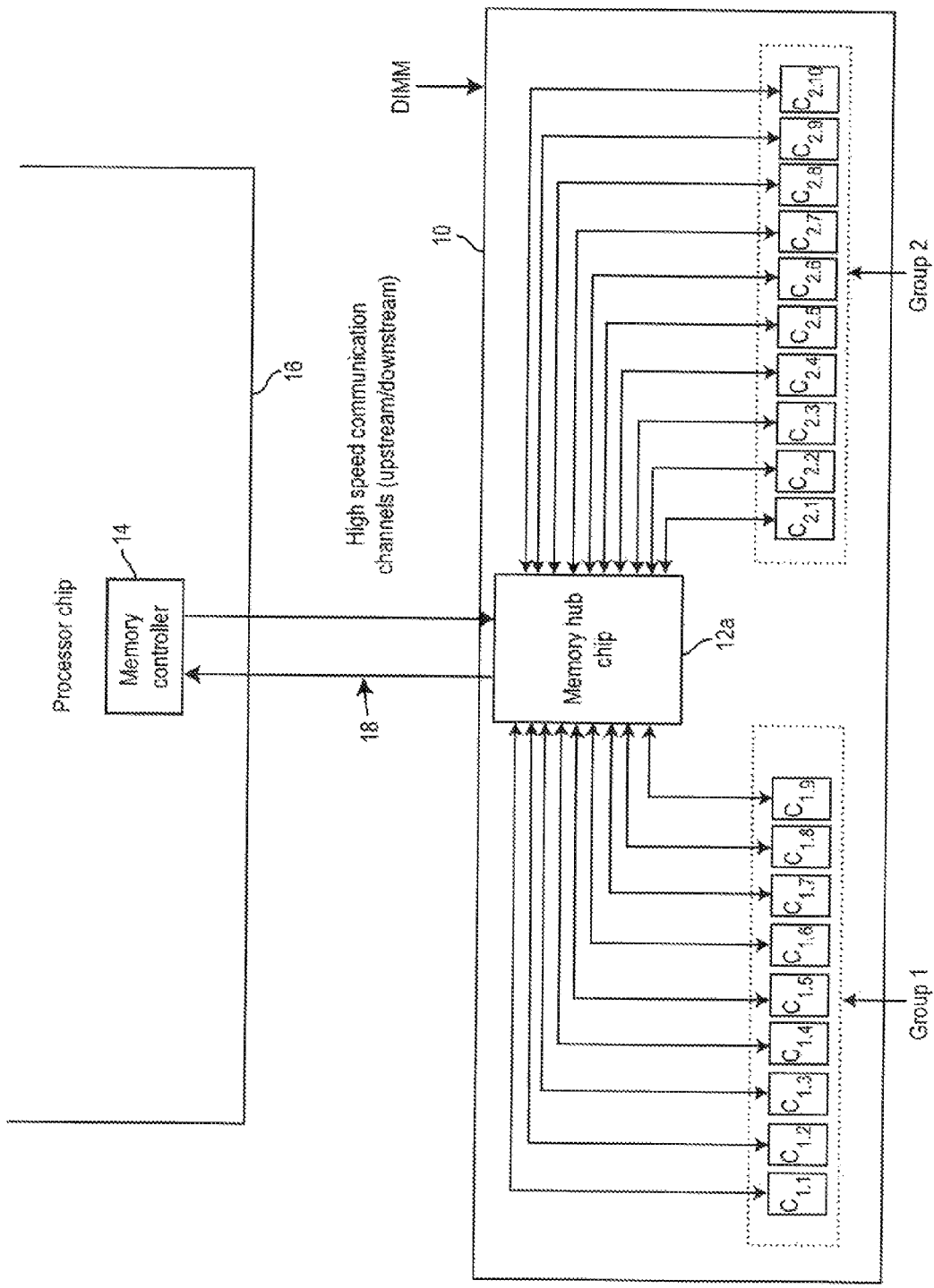
FIG. 6 is a block diagram of the memory system shown in FIG. 1 in which the DRAM devices are divided into two groups.

In order to describe our preferred embodiment, we will rely on the discussion in the background section above, we will maintain our assumption that our memory system is built using discrete DRAM devices, packaged as DIMMs, and where each DRAM is a ×8, burst 8 device. As previously stated, for the design shown in FIG. 3, a read operation from the DIMM results in 128 B worth of data supplied, not including stored redundancy. We now assume that we wish to access information on a 64 B granularity. To accomplish this, we will employ the alternate DIMM structure in FIG. 6, where two independent groups of DRAM devices can be accessed at any given time, and where Group 1 has one additional redundant chip and Group 2 has two additional redundant chips. In this example, the line size is 128 B and the desired subline size is 64 B. In general, one says that a memory possesses subline accesses if a request for a reading or storing a subline's worth of data in the memory can be accomplished using a reduced number of resources with respect to a request for the larger line which contains the subline. Typically, the design of the memory or the mechanisms for accessing it need to be explicitly designed so as to allow such subline accesses. In this example, through the special DIMM structure (with its split buses) one activates approximately half of the DRAM devices during a subline read than during a line read, and thus we indeed say that this memory has subline accesses. It is noted that if one is willing to pay the cost of additional buses, it is feasible to attain fairly small access granulatities in memories built using DRAM devices.

Figure 7:
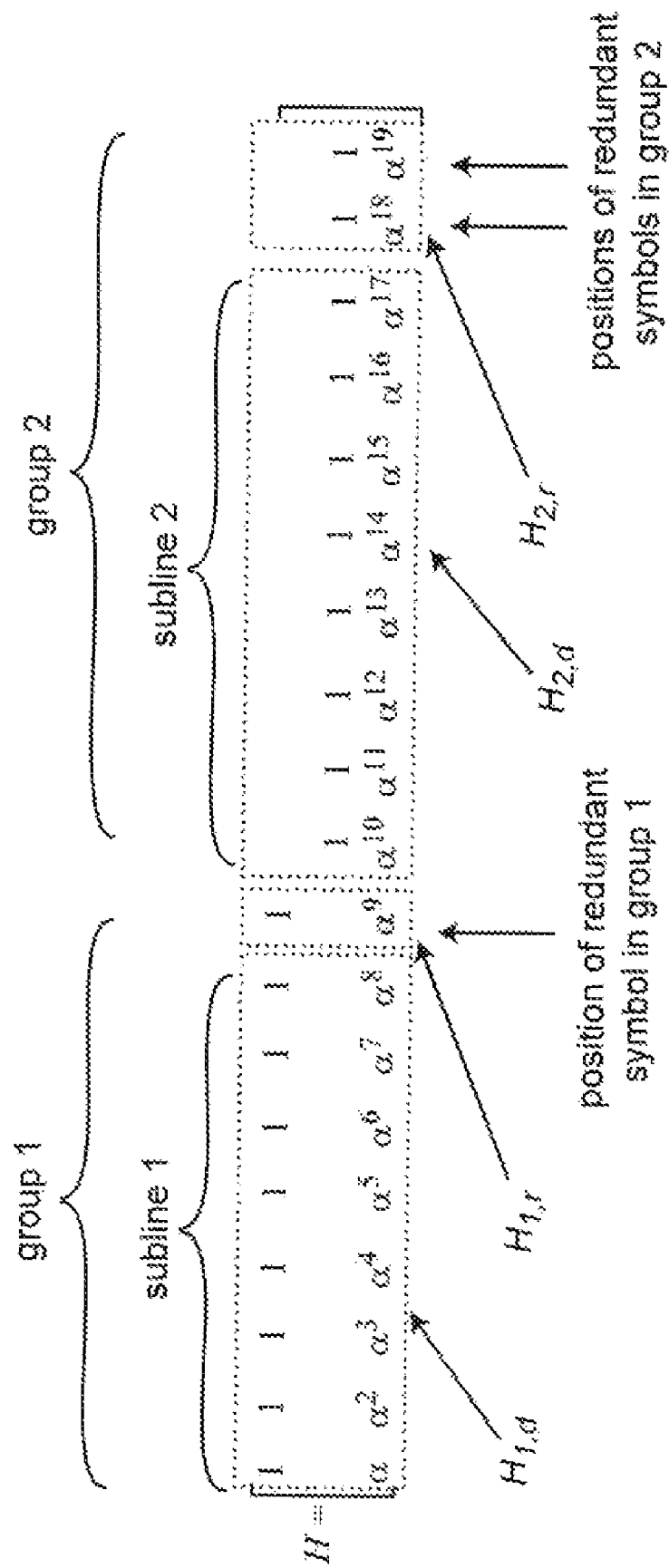
FIG. 7 is a block diagram illustrating the organization of the DRAM devices into two groups and the locations of sublines 1 and 2 and the positions of redundant symbols for each of Groups 1 and 2.

Instead of using two independent codes, each applied to Group 1 and Group 2, we will employ an error correcting code whose parity check matrix can be written as $H=[H_{1,d} H_{1,r} H_{2,d} H_{2,r}]$, as illustrated in FIG. 7, where alpha denotes a primitive element of GF(256). Also indicated in FIG. 7 is the assignment that we have made for the codeword's symbols for Groups 1 and 2, together with the choices for the symbols that will convey the redundant information. It will be sometimes convenient to refer to the sections depending on whether they are associated with Group 1 or Group 2 and also whether the section is associated with symbols in the codeword assigned to data or redundant check symbols. The partitioning is shown in FIG. 7.

The reader conversant with the theory of error control codes will recognize that the matrix above is presented in non-systematic form in that it is not immediately evident from the structure of the matrix on how to select the redundant symbols given the information that one wishes to store in the memory, so that the standard parity check equation $H_c=0$ is satisfied. In order to facilitate our discussion, the codeword c will sometimes be written as $(c_{1,1} c_{1,2} c_{1,3}, \ldots, c_{1,9} c_{2,1} c_{2,2} c_{2,3}, \ldots, c_{2,9}, c_{2,10})$, where the notation makes explicit when one symbol belongs to Group 1 or Group 2. Additionally, we will assume that $c_{1,9}$ is the redundant symbol for Group 1 and $(c_{2,9}, c_{2,10})$ are the redundant symbols for Group 2.

It is obvious from the equation $H_c=0$ that the redundant symbol for Group 1 can be immediately computed from the associated information symbols using $$c_{1,9} = -\sum_{i=1}^{8} c_{1,i}$$

We shall say that this redundant symbol is private, in light of the fact that its value is completely determined by the group's user data symbols. After this computation, it is possible to compute $c_{2,9}$ and $c_{2,10}$ as follows. Let b denote all but the last two elements of c (i.e., we are excluding $c_{2,9}$ and $c_{2,10}$). The value of b is completely known at this point, since we know both the information symbols for the two groups as well as the redundant symbol for the first group. One can easily see that $$H_{2,r}\begin{bmatrix} c_{2,9} \\ c_{2,10} \end{bmatrix} = -[H_{1,d} \ H_{1,r} \ H_{2,d}]b$$

The above represents three linear equations, but the first one is the trival 0=0. It can be checked that the other two equations have a unique solution, which can be easily obtained using well known techniques. Since the values for these two redundant symbols in principle depend on every user data symbol in both groups, we shall call these shared redundant symbols. This completes the discussion on how to compute the three redundant symbols given the pair of 8 B data chunks.

A code is a set of symbol vectors all of the same length. Symbol vectors that belong to a code are called codewords. When one reads all of the symbols coming from one group (but not anything else), the resulting vector is said to be a codeword of a minor code (assuming that there were no errors in the data and redundancy retrieved). Different groups may be associated with different minor codes. In fact, in this example, both minor codes are distinct as their blocklengths clearly differ (one of them has blocklength 9, the other one has blocklength 10). For brevity, one shall refer to the ensemble of minor codes associated with all of the sublines in one line as the "first level code". Similarly, if one reads all of the symbols of all of the groups the resulting vector is a valid codeword of the "second level code". This code is obviously defined by the entire parity check matrix H. We will also say that the first level code provides local protection (to the each of the sublines) whereas the second level code provides global protection to the entire line.

It can be shown that either minor code has minimum distance 2, and that the overall code has minimum distance 3. Accordingly, when applying this code to the memory storage problem that we are discussing, we are able to do single chip error detection when either of the two groups are retrieved (but not the other), and single chip error correction when both groups are retrieved.

The above findings motivate the following two-level protocol for a subline read operation:

a) read only the information of the corresponding group, b) check for the presence of errors in the group by using the first level code, and c) if an error is found, read the rest of the codeword and attempt correction of the error using the second level code.

Errors in memories can be categorized according to their frequency of incidence. Errors which are the result of permanent physical damage to some part of memory (for example, an I/O signal driver) will occur with such a high frequency that a system can recognize them and take appropriate actions to remove them from the system. One technique for doing that is to copy the affected data (which is being corrected by error control codes) to a spare DRAM chip. Another technique is simply to replace the failing DIMM through external intervention.

Figure 5:
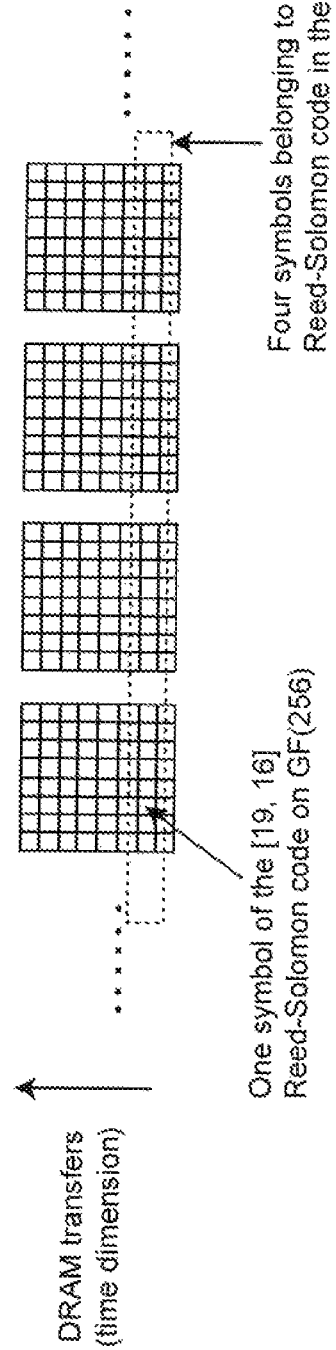
FIG. 5 is a schematic illustration of the transmission patterns of the parallel DRAM devices (only a section shown)

As a result of the above, during normal system operation errors are very rare. As a consequence of this, the two-level protocol that we have disclosed in this invention results in the vast majority of reads being successfully serviced using subline operations, which is one of the stated goals for this invention. An illustration of the fact that this memory can serve two concurrent read operations at different addresses can be found in FIG. 5.

Memory systems are sometimes enhanced with a technique called "memory scrubbing" where periodically memory is scanned, reading the memory contents and correcting (and writing back the corrected data) if errors are found in the memory. This is done to prevent the accumulation of errors in the system. An aspect of this invention is that scrubbing is not done using subline operations, but rather line operations. In particular, whole lines are interpreted with respect to the redundancy of the second level code to test for errors which is advantageous in instances in which the error correction strength of the second level error control code is much superior to the available error detection capacity of the first level code. For example, a double error may exist in a subline which the first level code cannot detect, but which can be detected and corrected in using the second level redundancy.

Another policy that may be practiced with this memory is to not only do error detection but also attempt some degree of error correction using the first level code (as done in some of the prior art in the hard disk storage technology application). For example, an extended Hamming code may be used as a first level code in order to do single bit error correction using the first level code, and simultaneously, detect double bit errors, but rely on the second level code to correct for double bit errors.

We now turn our attention to the problem of performing write operations. The essential problem here is that a change to even one symbol in any group can affect redundant symbols in both groups. As a result, write operations are more complex than read operations. Nevertheless, when one takes into account typical ratios of the number of read operations to write operations, overall system operation is still improved by this invention.

We first discuss the problem of executing a read-modify-write (RMW) on the memory as this becomes the basis of understanding the write problem and is also of independent interest. To do this, suppose that we request a RMW to the second group (the one that has two redundant checks). In this case no changes to the first group are needed whatsoever.

The contents of the memory before the RMW request are denoted by $(c_{1,1} \ c_{1,2} \ldots c_{1,8} \ c_{1,9} \ c_{2,1} \ c_{2,2} \ldots c_{2,8} \ c_{2,9} \ c_{2,10})$. The contents of the memory after the RMW request are denoted by $(c_{1,1} \ c_{1,2} \ldots c_{1,8} \ c_{1,9} \ a_{2,1} \ a_{2,2} \ldots a_{2,8} \ a_{2,9} \ a_{2,10})$. Our task is to select $(a_{2,9} \ a_{2,10})$ by knowing only $(c_{2,1} \ c_{2,2} \ldots c_{2,8} \ c_{2,9} \ c_{2,10})$, which is retrieved during the read operation, and $(a_{2,1} \ a_{2,2} \ldots a_{2,8})$, the new data that will be stored in the memory. The following holds for the old data:

$$\left( H_{2,d}\begin{bmatrix} c_{2,1} \\ \vdots \\ c_{2,8} \end{bmatrix} + H_{2,r}\begin{bmatrix} c_{2,9} \\ c_{2,10} \end{bmatrix} \right) + \left( H_{1,d}\begin{bmatrix} c_{1,1} \\ \vdots \\ c_{1,8} \end{bmatrix} + H_{1,r}c_{1,9} \right) = 0$$

We want the following to hold for the new data:

$$\left( H_{2,d}\begin{bmatrix} a_{2,1} \\ \vdots \\ a_{2,8} \end{bmatrix} + H_{2,r}\begin{bmatrix} a_{2,9} \\ a_{2,10} \end{bmatrix} \right) + \left( H_{1,d}\begin{bmatrix} c_{1,1} \\ \vdots \\ c_{1,8} \end{bmatrix} + H_{1,r}c_{1,9} \right) = 0$$

Note that in both equations the expression in the second parenthesis is identical. From these equations, we can obtain the formula:

$$H_{2,r}\begin{bmatrix} a_{2,9} \\ a_{2,10} \end{bmatrix} = H_{2,d}\begin{bmatrix} c_{2,1} - a_{2,1} \\ \vdots \\ c_{2,8} - a_{2,8} \end{bmatrix} + H_{2,r}\begin{bmatrix} c_{2,9} \\ c_{2,10} \end{bmatrix}$$

This formula represents three equations, but the first one is the trivial 0=0. The other two equations can be easily solved for $a_{2,9}$ and $a_{2,10}$ which are the new values for the old symbols $c_{2,9}, c_{2,10}$. We note that the fact that these symbols are shared redundancy does not imply that all of the data symbols that participate in their calculation need to be retrieved in order to update them. This is because some symbols (in this case those of Group 1) do not change their value, and one can use the technique described above to avoid their retrieval.

It is interesting to note that it is in principle possible to simply send the "differential update"

$$H_{2,d}\begin{bmatrix} c_{2,1} - a_{2,1} \\ \vdots \\ c_{2,8} - a_{2,8} \end{bmatrix}$$

to the memory devices and have the memory devices compute internally the new value of the redundant symbols if the memory is structured to be able to do this. Under these conditions, we would not need to physically convey $(c_{2,9}, c_{2,10})$ to a separate location to compute the new redundant symbol values. While this observation may seem trivial, basic memory technology improvements to support these general types of operations may be important to support error handling schemes like the one described in this invention (we will say more about this when we discuss operations to Group 2).

Another point worth noting is that it is not necessary to transport the old values $c_{2,1}, \ldots, c_{2,8}$ physically outside of the memory devices if we know beforehand the value of the difference $(c_{2,1}-a_{2,1}, \ldots, c_{2,8}-a_{2,8})$, and if the memory is equipped to do differential updates as described above. Sending the difference to the memory and indicating the fact that the update should be differential would have the desired effect.

In some instances it is possible to construct the Galois Field so that the "+" operation is simply a logical XOR operation. Thus, the differential updates alluded to above are particularly easy to accomplish; we shall refer to a memory which allows its information contents to be updated by receiving a pattern of bits and XORing the received pattern of bits with a chosen data content shall be referred to as an XOR update memory.

This demonstrates that the RMW operation to Group 2 can be performed using strictly subline operations.

We now discuss how to do a RMW operation to Group 1. In this case, changing any of the eight data symbols from Group 1 requires an update of not only the redundant symbol for Group 1, but also the redundant symbols for Group 2. Using a similar notation as before, the contents of the memory after the RMW request are denoted by $(a_{1,1}\ a_{1,2} \ldots a_{1,8}\ a_{1,9}\ c_{2,1}\ c_{2,2} \ldots a_{2,9}\ a_{2,10})$. In this case, the following equation must be satisfied via proper selection of $(a_{1,9}, a_{2,9}, a_{2,10})$ $$\left(H_{2,d}\begin{bmatrix} c_{2,1} \\ \vdots \\ c_{2,8} \end{bmatrix} + H_{2,r}\begin{bmatrix} a_{2,9} \\ a_{2,10} \end{bmatrix}\right) + \left(H_{1,d}\begin{bmatrix} a_{1,1} \\ \vdots \\ a_{1,8} \end{bmatrix} + H_{1,r}a_{1,9}\right) = 0$$

There are two ways of accomplishing this. The first way is to simply read $c_{2,1}, c_{2,2}, \ldots, c_{2,8}$ and encode the standard way, since now we would have access to all 16 B of user information that we wish to store in the memory. In the new method according to this invention, we make use of the fact that $$[H_{1,r}\ H_{2,r}]\begin{bmatrix} a_{1,9} - c_{1,9} \\ a_{2,9} - c_{2,9} \\ a_{2,10} - c_{2,10} \end{bmatrix} + H_{1,d}\begin{bmatrix} a_{1,1} - c_{1,1} \\ \vdots \\ a_{1,8} - c_{1,8} \end{bmatrix} = 0$$

The 3×3 matrix pre-multiplying the first vector can be inverted to solve for the differential updates required for the redundant symbols, using only the difference between the new and old values of the memory contents in Group 1. Thus, in reality it is not needed to retrieve $c_{2,1}, c_{2,2}, \ldots, c_{2,8}$ at all. Retrieving $c_{2,9}$ and $c_{2,10}$ from the second group (in addition to retrieving all of the information from the first group) is in fact sufficient (such a retrieval pattern would be allowed by a special DIMM configuration described at the beginning of this section). This technique for updating shared redundant symbols during a write can be generally extended and will be referred to as a differential write in subsequent discussions. The key property is that stored data that is not changing in value need not be read in order to update the shared redundancy. Furthermore, the availability of an XOR update memory device would facilitate even more the update of the redundant symbols in Group 2 and/or the actual new data and redundant symbols for Group 1.

This finishes the discussion on how to make subline RMW operations in Groups 1 and 2. As for the write operation, if the old value of the memory contents is not known (which would convert the write effectively into an RMW for the purposes of our coding discussion), then in one implementation every subline write needs to be preceded by a subline read from the memory. Thus, a write operation effectively becomes a RMW and when the differential RMW technique described above is used, we shall call the write a differential write.

The methods for reading and writing a memory in sublines (and yet maintaining a high level of reliability) are extensible to significantly more general situations than described above. In particular, the number of groups that share redundant symbols can be larger than two. In the example given, the redundant symbol in Group 1 is said to be private in that its value can be set solely by knowing only the contents of Group 1, and the redundant symbols in Group 2 are said to be shared due to the fact that changes in either group need to be reflected in the changes of those redundant symbols in order to maintain a valid overall codeword.

More generally, in a general error control coding scheme for two or more groups, a redundant symbol in a group is said to be private if its contents are completely determined by the contents of the user data stored in the associated group, and shared otherwise. We note that the shared label does not imply that the shared symbols can only be interpreted when reading from the memory all of the information that affects those shared symbols. To further illustrate this point we note that the shared symbols in Group 2 can be read together with the rest of the symbols in Group 2 and the result is a code with minimum distance 2, which suffices to do single symbol error detection; yet we did not have to read all of the information of the two groups in order for the shared symbols to be used effectively for error detection.

Generally, one may have any number of groups assigned shared symbols. For example, in a symmetric situation all of the groups may have the same number of redundant symbols and all of them can be designated as shared. The write operation in this case also becomes symmetric in that a change to any group in general results in updates needed at all of the shared redundant symbols.

We next present an extension of the differential RMW technique (which is the foundation for the differential write technique) to multiple groups. We choose for the error control code in this section a parity check matrix that is derived and extensively justified below as Construction 1 and Theorem 6, to which the reader is referred.

For the parity check matrix $H_b$, we choose a Reed-Solomon code. This ensures that the codes $C_a$ and $C_b$ as described in Construction 1 and Theorem 6 referred to above are Maximum-Distance-Separable, which as we show in a separate section, translates into a certain desirable optimality property for the overall two-level coding structure. The choice for $H_b$ as a Reed-Solomon code comes with the restriction that n, which is the total number of symbols of data stored in a line plus the number of redundant symbols (both for the first level code and the second level code), must be less than q, the cardinality of Galois Field used to construct the code. The total amount of information that may be stored on this memory will then depend on the desired reliability parameters $d_a, d_b$ and the desired number of groups M, along with the amount of user data that needs to be stored in any given group, which will be denoted by k (and is counted in the unit of Galois Field symbols), with the exception of the last group as we shall see.

The construction above does not specify how which coordinates of a codeword belong to data versus redundancy; in fact it even allows for different minor code blocklengths. We shall assume that the last group (indexed by M) will not contain any user data and rather will contain all of the shared redundant symbols; correspondingly we shall call it the shared redundancy group. Correspondingly, the blocklength of the $M^{th}$ group needs to be adjusted so that it is equal to $d_b-1$. As for the first M−1 groups, within each group the total blocklength will be equal to $d_a+k-1$, where as previously stated, k is the number of user data symbols that one desires to store in each of the groups.

In order to describe the differential RMW technique, we write $$H_{ba} = [H_{ba}^{(1)} H_{ba}^{(2,\ldots,M-1)} H_{ba}^{(M)}]$$

where $H_{ba}^{(1)}$ denotes the first $d_a+k-1$ columns of $H_{ba}$ and $H_{ba}^{(M)}$ denotes the last $d_b-1$ columns of $H_{ba}$. Now suppose a vector c is stored at the memory (c denotes the contents of a line together with its first and second level redundant checks). We first assume that c does not have any errors and thus the parity check equation Hc=0 holds. We assume that we desire to update the contents of the first group, without any loss of generality. To this effect, we partition $$c = [c_1 c_{2,\ldots,M-1} c_M]^T$$

where our partition for c coincides with the partition defined for $H_b$. The new memory contents are denoted by $$[a_1 c_{2,\ldots,M-1} a_M]^T$$

where $a_1$ denotes the new codeword from the first minor code (which itself consists on the new contents of the user data in the first group augmented with valid first level code (or equivalently minor code) redundant check symbols. We note that the computation of such first level code check symbols is a straightforward exercise for those skilled in the field of error control coding. In the above, $a_M$ denotes the new values for the shared redundant check symbols; it is the value of these that we need to compute.

As taught by the previous example, since both vectors above are valid codewords of the code H, the following must be satisfied:

$$H_{ba}^{(1)} c_1 + H_{ba}^{(2,\ldots,M-1)} c_{2,\ldots,M-1} + H_{ba}^{(M)} c_M = 0$$

$$H_{ba}^{(1)} a_1 + H_{ba}^{(2,\ldots,M-1)} c_{2,\ldots,M-1} + H_{ba}^{(M)} a_M = 0$$

In addition, the $M^{th}$ group's minor code parity check equation states that $$H_a^{(M)} a_M = 0$$

From these, it is easy to see that $$\begin{bmatrix} H_a^{(M)} \\ H_{ba}^{(M)} \end{bmatrix} a_M = \begin{bmatrix} 0 \\ H_{ba}^{(M)} c_M + H_{ba}^{(1)} (c_1 - a_1) \end{bmatrix}$$

The matrix in the left is a square matrix with dimensions $(d_b-1) \times (d_b-1)$. By our choice of construction it can be shown that this matrix is invertible, and hence a unique choice for $a_M$ exists and can be computed in this manner. We note that in order to execute the above computation it was unnecessary to know $c_{2,\ldots,M-1}$ which shows the key differential RMW property. The formula thus derived for $a_M$ is termed the differential RMW formula. When M is significantly large, the procedure above can result (for example) in significant energy savings by reading and writing sublines instead of entire lines. The write operation is obtained by converting it to a RMW as described earlier. We note that in the construction above the $M^{th}$ group may also be read in isolation with respect to the rest of the groups and errors may be detected, up to the prescribed minimum distance $d_a$.

This is an important feature which allows us to handle errors that may arise in the shared redundancy group. With this in mind, a subline RMW operation for this setting may be summarized as follows:

1) Read the group containing the subline to be modified.

2) Read the shared redundancy group.

3) Determine whether there are errors in either of the two groups read above. If there are errors, read the entire line (together with its first and second level redundancy) and correct the errors. Update the subline and store back the entire line.

4) If there are no errors, compute the new values for the shared redundancy group using the differential RMW formula and modify the subline and the shared redundancy group in the memory.

Suppose that the special group that holds the shared redundant symbols are physically implemented using a memory that allows for multiple concurrent read/write operations. For simplicity, let us assume that the memory where the actual (non-redundant) information is stored only allows for one read or write operation per group. Then in principle (assuming a sufficiently high level of concurrency for the shared redundancy memory), one may have a number of writes to different groups being executed at any given time, with the resulting updates to the shared redundant symbols supported by the assumed concurrency capability. Moreover, multiple reads can also be executed to the groups that are not performing writes since the private redundancies are not affected by the write operations.

We note in the next section that prior published two-level coding structures satisfy certain desirable optimality properties only under restricted scenarios. Therefore, this invention discloses new error control codes (as for example evidenced by construction 1 above) as well as their application to the present problem of subline access. Also in construction 2 we demonstrate a technique that in certain instances allows us to obtain optimum codes for choices of parameters for which construction 1 cannot yield any codes; in particular the restriction that states that the field size in construction 1 needs to be sufficiently large is addressed.

A generally accepted way of describing an error control code is to show its parity check matrix H. This is because such a matrix identifies precisely which vectors are valid codewords of the code; that is, a vector c is a valid codeword if the linear equation $H_c = 0$ is satisfied. In interpreting this invention, we note that a given error control code in principle admits multiple parity check matrices as a characterization of its valid codewords. In particular, multiplying any given row of the matrix by a common factor or adding one row of the matrix H to another one does not change whatsoever the set of vectors that are valid codewords of a code. When one matrix H' can be obtained from another matrix H via one or more row multiplications and/or row additions, we say that the two check matrices are equivalent.

With this in light of our invention, we will disclose novel error control codes through one particular form for their check matrices, with the understanding that the same code may be described by an equivalent check matrix. Such alternative representation of the code does not represent an essential departure from the present invention. A concept that we will use in our description is that of Maximum Distance Separable (MDS) codes, which is a technical term well known in the art of error control coding. A Maximum Distance Separable code is one which is optimum in the sense of attaining the maximum possible code minimum distance given the number of redundant check symbols. It is known that any Reed-Solomon code is Maximum Distance Separable.

It is also noted that the present application of two level coding structures need not be restricted to a problem of storage. In particular, communication systems may also be benefited by such structures, whereby for example high speed transmission of a data stream may be attained by performing only local error detection on what we currently term sublines (which say would be a section of a transmission bus) and then performing error correction in a secondary, slower mode. The above would have the benefit of employing low complexity and low latency coding structures during most of the link's operation (this is assuming a relatively clean link) and resorting to more complex and time consuming procedures only in special circumstances.

General Constructions of Error Control Codes

Let C be a code of length n (not necessarily linear) over an alphabet of size q. The dimension of C is $k = \log_q |C|$, and the redundancy of C is n−k. The minimum (Hamming) distance of C is $$d = \min_{x,y \in C, x \neq y} |\{i : x_i \neq y_i\}|.$$

We say that C is a [n,k] code, or, a [n,k,d] code, as a handy reference to its basic parameters. Each codeword of C consists of n symbols. Let them be indexed by 1, 2, ..., n. Denote $[n] = \{1, 2, \ldots, n\}$. Given $I_i \subset [n]$, i=1, ..., M, let M minor codes, $C_i = C(I_i)$, i=1, ..., M, be defined as the projection of C onto the coordinates in $I_i$. Let $n_i = |I_i|$, and denote $I_i = \{1_1^{(i)}, 1_2^{(i)}, \ldots, 1_{n_i}^{(i)}\}$, such that $1_1^{(i)} < 1_2^{(i)} < \ldots < 1_{n_i}^{(i)}$. Then the above definition is to say that $\underline{c}^{(i)} = (c_1^{(i)}, \ldots, c_{n_i}^{(i)}) \in C_i$ if and only if there exists $\underline{c} = (c_1, \ldots, c_n) \in C$, such that $c_j^{(i)} = c_{j^{(i)}}$ for all $1_j^{(i)} \in I_i$. We denote the minimum distance of $C_i$ by $d_i$. Sometimes, we refer to a codeword of C as a line, and a codeword of $C_i$ as a subline[a]. Thus, $C_i$ will also be called a subline code. In this section, we assume that all vectors are row vectors if labeled without the "T" subscript (which stands for transpose). Thus, a vector a is a row vector, and the vector $a^T$ is a column vector (i.e., transposed version of vector a). This convention is different from that adopted in the earlier section of this description.

[a] To be exact, lines and sublines indeed refer to the uncoded data that are embedded in the corresponding codewords. We choose to use these terms to refer to the corresponding codewords as well for convenience. The meanings of these terms will become clear from the contexts within which they are used.

Given the definition above, the question is why not one level of coding?

Theorem 1. If there exists a permutation $\pi : [M] \mapsto [M]$, such that for all i, $|I_{\pi(i)}, \cup_{j<i} I_{\pi(j)}| \geq d_{\pi(i)} - 1$, then $$\sum_i (d_i - 1) \leq r.$$

Proof. Consider the following experiment. Take a codeword of C, erase $d_1 - 1$ symbols from those indexed by $I_1$, $d_2 - 1$ from $I_2$, ..., $d_M - 1$ from $I_M$. This is possible as long as $|I_i, \cup_{j<i} I_j| \geq d_i - 1$ for all i. Now, by definition, the $d_1 - 1$ erasures from $I_1$ can be corrected using $C_1$, after which the $d_2 - 1$ erasures from $I_2$ can be corrected using $C_2$, etc., until all erasures are corrected. By the Singleton bound, we must have $\Sigma_i (d_i - 1) \leq r$. Finally, note that if the condition $|I_i, \text{Å}_{j<i} I_j| \geq d_i - 1$ is not satisfied for all i, we can try any relabelling of the $I_i$'s and as long as one works, we arrive at the same inequality.

The message from Theorem 1 is that unless the minor codes have rather significant overlaps, the sum of minimum distances will be bounded by what is realizable using disjoint minor codes (disjoint in terms of $I_i$'s). A natural question is whether by employing moderate overlaps among the minor codes, we can gain enough in the minor codes' minimum distances so that subline access is economical without going to a two-level coding scheme.

Let us formulate the problem. Suppose all minor codes are to have the same length $n_i = n_1$, and the same minimum distance $d_i = d_1$. WLOG, assume $\cup_i I_i = [n]$. In the regime of Theorem 1, we have $d_1 \leq r/M + 1$. We know for sure that with enough overlaps we potentially are constrained only by $d_1 \leq r + 1$. Depending on how ambitious we are in getting larger and larger $d_1$, we would like to know what this has to imply about $n_1$.

Theorem 2. If $d_1 > r/m+1$, where $m \in \{2, 3, \ldots, M\}$, then $$n_1 \geq \frac{1}{m-1}k + d_1 - 1.$$

Proof. Consider the same experiment we did in the proof of Theorem 1, in which we erase $\min\{d_1-1, |I_i, Å_{j<i}I_j|\}$ symbols from coordinates indexed by $I_i, \cup_{j<i}I_j$. Such an erasure pattern can be decoded successively using $C_1, C_2, \ldots, C_M$. This implies in general, that $$\sum_i \min\left\{d_1 - 1, \left|I_i, \bigcup_{j<i} I_j\right|\right\} \leq r.$$

For ease of notation, define $\tilde{I}_i = I_i, \cup_{j<i}I_j$. Let $A = \{j : |\tilde{I}_j| \geq d_1 - 1\}$, and $m' = |A|$. We have $$m'(d_1 - 1) + \sum_{i \notin A} |\tilde{I}_i| \leq r,$$

which implies $m' < m$. Now, noting that $\{\tilde{I}_i\}_{i=1}^M$ is a set partition of $[n]$, we have $$n_1 = |I_1| =$$

$$n - \sum_{i=2}^M |\tilde{I}_i| \geq n - (m'-1)n_1 - \sum_{i \notin A} |\tilde{I}_i| \geq n - (m'-1)n_1 - r + m'(d_1 - 1).$$

Hence, $$n_1 \geq \frac{1}{m'}k + d_1 - 1 \geq \frac{1}{m-1}k + d_1 - 1.$$

The result of Theorem 2 can be rephrased as in the following corollary.

Corollary 1. If $d_1 > r/M+1$, then $$n_1 \geq \left\lfloor \frac{r}{d_1 - 1} \right\rfloor^{-1} k + d_1 - 1.$$

The moral of Theorem 2 is that overlapping does not help. Suppose $r/m+1 < d_1 \leq r/(m-1)+1$. Then ignoring integer effects, the lower bound of Theorem 2 is achieved by coding $m-1$ disjoint minor codes, each with redundancy $r/(m-1)$ (assuming that the field size is large enough). We then get up to M minor codes by duplicating any of the $m-1$ codes $M-m+1$ times.

An alternative interpretation can be as follows. Again, suppose $r/m+1 < d_1 \leq r/(m-1)+1$. We have $$\frac{d_1 - 1}{n_1} \leq \frac{d_1 - 1}{d_1 - 1 + \frac{1}{m-1}k} = 1 - \frac{k}{k + (m-1)(d_1 - 1)} \leq \frac{r}{n}.$$

In other words (also evident from Corollary 1), $$d_1 \leq \frac{n_1}{n}r + 1$$

This shows that for given line size (n) and total redundancy (r), there is a tradeoff between subline code length ($n_1$) and subline minimum distance ($d_1$). The tradeoff is such that at least in the bound, the "effective redundancy" for a subline (i.e., $d_1-1$) grows at most proportionally to $n_1$. That is, to get twice the effective redundancy, the subline code has be at least twice as long. This implies that we can always do as well using minor codes coded individually on disjoint sets.

The conclusion of this section is that economical subline access is quite hopeless for a single "level" of codes, without incurring at least the same overhead penalty as required for a naïve solution.

This motivates the need of a change of paradigm, namely, to use a two-level coding scheme, in which the overall overhead is reduced by reducing $d_1$ to just enough for error detection and having some global redundancy shared by all the sublines for error correction when needed. The vision is that errors are rare (as they are in memory systems), so in most of the time (when no errors are detected) subline access is possible, which will have the benefits we have outlined earlier.

Bounds on Redundancy-Distance Tradeoff

In a two-level coding setup, we are interested in the tradeoff between $r, d,$ and $d_i, i=1, \ldots, M$. For simplicity, suppose $d_i = d_1$ for all i, and all minor codes are disjoint. We have the following theorem.

Theorem 3. If $d \leq \max_i n_i + 1$, then $$r \geq d - 1 + M(d_1 - 1). \tag{1}$$

Proof. Since $d \leq \max_i n_i + 1$, in the procedure we described in the proof of Theorem 1, we can erase $d-1$ symbols in the last step instead.

The above bound can be generalized.

Theorem 4.

$$r \geq \left(M - \left\lfloor \frac{d-1}{n_1} \right\rfloor - 1\right)(d_1 - 1) + \left\lfloor \frac{d-1}{n_1} \right\rfloor n_1 + \max\{d_1 - 1, (d-1) \bmod n_1\}.$$

Proof. Similar to the proof of Theorem 3, but note that we in general can erase $(d_1-1)$ symbols each in some $(M - \lfloor (d-1)/n_1 \rfloor - 1)$ subline codes, $n_1$ symbols each in some other $\lfloor (d-1)/n_1 \rfloor$ subline codes, and a choice of either $(d_1-1)$ or $((d-1) \bmod n_1)$ symbols in the remaining subline code.

When we are not limited by size of the alphabet over which the code is defined, then Theorem 3 and Theorem 4 are the relevant bounds. When the alphabet size is small, however, other bounds become significant, for example, a sphere-packing type of bound as given in the following.

Suppose C can correct up to t errors and each subline code $C_i$ can correct $t_i$ errors. For simplicity, assume $t_i = t_1$ or all i.

Theorem 5. We have $$q^r \geq V(n, q, t) + \sum_{i=t+1}^{Mt_1} (q-1)^i \sum_{p \in P_M(i)} \prod_{j=1}^{M} \binom{n_1}{p_j},$$

where $$V(n, q, t) = \sum_{i=0}^{t} \binom{n}{i}(q-1)^i$$

is the volume of a Hamming ball in $GF(q)^n$ with radius t, and $P_M(i)$ is the set of M-way ordered integer partitions of i whose components are all less than or equal to $t_1$.

Proof. The exclusive region around any codeword of C is at least a radius-t Hamming ball plus some additional regions that are at Hamming distance larger than t from the codeword but must be exclusive from similar regions near any other codeword because of the error correction capability of the subline codes.

Code Constructions

It turns out (1) can be achieved quite easily if the field size over which C is defined is large enough. One such construction is as follows. BTW, we shall always require that $\cup_i I_i = [n]$, so that the shared redundancy is also protected by the minor codes. And WLOG, we will assume that $I_i = \{\Sigma_{j<i} n_j + 1, \ldots, \Sigma_{j \leq i} n_j\}$. Whenever we speak of a parity-check matrix, unless otherwise noted, we assume one that has full row rank.

Construction 1. Let $C_a$ and $C_b \subset C_a$ be linear codes of length n and minimum distances $d_a$ and $d_b$, respectively. Let $H_a$ be a parity-check matrix for $C_a$, and $$H_b = \begin{bmatrix} H_a \\ H_{ba} \end{bmatrix}$$

be a parity-check matrix for $C_b$. If we write $$H_a = [H_a^{(1)} H_a^{(2)} \ldots H_a^{(M)}],$$

where $H_a^{(1)}$ contains the first $n_1$ columns, $H_a^{(2)}$ the next $n_2$ columns, etc., then let C be constructed by the following parity-check matrix:

$$H = \begin{bmatrix} H_a^{(1)} & & & & \\ & H_a^{(2)} & & & \\ & & \ddots & & \\ & & & H_a^{(M)} & \\ & & H_{ba} & & \end{bmatrix}$$

Theorem 6. For Construction 1, all minor codes have minimum distances at least $d_a$, and C has minimum distance at least $d_b$.

Proof. From the form of H, it is clear that all $C_i$, i=1, ..., M, are subcodes of shortened versions of $C_a$. It is also clear that C is a subcode of $C_b$.

Corollary 2. If both $C_a$ and $C_b$ are MDS codes, and $n_i \geq d_a$, for all i, then the code given by Construction 1 achieves the bound of (1) with equality. Proof. For all j, $$r \geq d - 1 + \sum_{i \neq j}(d_i - 1) \geq d_b - 1 + (M-1)(d_a - 1) = r.$$

Therefore, $d = d_b$, $d_i = d_a$ for all i, and $d = r + 1 - (M-1)(d_1 - 1)$.

In order to achieve the bound of (1), Construction 1 requires the existence of a linear MDS code of length n and minimum distance d, which implies that q, the size of the field, cannot be much smaller than n. For Reed-Solomon codes (and their single and double extensions), we will need $q \geq n-1$.

In cases where we don't have the luxury of a larger field size, we can try to do something similar. A very related class of codes has been known as integrated interleaving, which we describe in the follows. With a small loss of generality, let us assume that $n_i = n_1$ for all i. Suppose we have two length-$n_1$ linear codes $C_a \supset C_b$ over GF(q), with dimensions $k_a > k_b$ and minimum distances $d_a < d_b$, respectively. If $H_a$ is the parity-check matrix for $C_a$, $H_b$ is the parity-check matrix for $C_b$, and that $$H_b = \begin{bmatrix} H_a \\ H_{ba} \end{bmatrix}$$

then the parity-check matrix for C can be written as $$H = \begin{bmatrix} I \otimes H_a \\ \Gamma \otimes H_{ba} \end{bmatrix}$$

where I is the M×M identity matrix, M<q, $\otimes$ denotes the Kronecker product, and $$\Gamma = \begin{bmatrix} 1 & 1 & 1 & \cdots & 1 \\ 1 & \alpha & \alpha^2 & \cdots & \alpha^{M-1} \\ \cdots & \cdots & \cdots & \cdots & \cdots \\ 1 & \alpha^{B-1} & \alpha^{2(B-1)} & \cdots & \alpha^{(M-1)(B-1)} \end{bmatrix},$$

where $\alpha$ is a primitive root in GF(q), and $1 \leq B < M$.

It is shown that C is a $[Mn_1, (M-B)k_a + Bk_b]$ code with minimum distance $d = \min\{(B+1)d_a, d_b\}$. If we check these parameters against (1), we can see that integrated interleaving will achieve the bound of (1) with equality if and only if both $C_a$ and $C_b$ are MDS, B=1, and $d = d_b$. In particular, if it is so desired that $d > 2d_a$, then integrated interleaving is not optimal in the sense that it does not achieve the bound of (1).

Essentially, to form the codebook of C, integrated interleaving puts M codewords of $C_a$ side by side and then expurgates from the codebook of all such (longer) codewords by requiring that certain weighted sums of the shorter codewords must lie in $C_b$. It is noteworthy that the expurgation is done so that there always exist codewords with weight $(B+1)d_a$. More specifically, if $\gamma^*=0$, and $\underline{c}_a \in C_a$, then $\gamma \otimes \underline{c}_a$ is a codeword of C. Note that $\gamma^*=0$ if and only if $\gamma$ is a codeword in a [M,M−B] RS code (defined by parity-check matrix $\Gamma$). Therefore, C has at least $$\binom{M}{B+1} A_{d_a}$$

codewords of weight $(B+1)d_1$, where $A_{d_a}$ is the number of minimum weight codewords in $C_a$.

To see why we may be able to do better, consider first the simplest case where M=2, B=1. In this case, the parity-check matrix for the integrated interleaving construction is $$H = \begin{bmatrix} H_a & \\ & H_a \\ H_{ba} & h_{ba} \end{bmatrix}$$

Clearly, if $\underline{c}_1, \underline{c}_2 \in C_a$ have the same $H_{ba}$-syndrome, then $(\underline{c}_1, \underline{c}_2) \in C$. In particular, this allows minimum weight codewords in $C_a$ to pair up. Intuitively, we would rather like to keep those $(\underline{c}_1, \underline{c}_2)$ pairs such that when $\underline{c}_1$ has low weight, then $\underline{c}_2$ has large weight, or at least is likely to. Motivated by this observation, we instead construct C to conform to the following parity-check constraints:

$$H = \begin{bmatrix} H_a & \\ & H_a \\ H_{ba} & QH_{ba} \end{bmatrix}$$

where Q is a full-rank square matrix. Q allows us to pair up codewords of $C_a$ that lie in different cosets of $C_b$, rather than those in the same coset. In a sense, it "scrambles" the coset associations so that we may hope to have a "spectrum thinning" effect similar to what interleavers have on Turbo codes.

In general, our construction is as follows.

Construction 2. Let $C_a$ and $C_b \subset C_a$ be linear codes over GF(q) of length $n_1$ and minimum distances $d_a$ and $d_b$, respectively. Let $H_a$ be a parity-check matrix for $C_a$, and $$H_b = \begin{bmatrix} H_a \\ H_{ba} \end{bmatrix}$$

be a parity-check matrix for $C_b$. The constructed code, C is given by the following parity-check matrix:

$$H = \begin{bmatrix} H_a & & & & \\ & H_a & & & \\ & & \ddots & & \\ & & & & H_a \\ H_{ba} & Q_1 H_{ba} & \cdots & & Q_{M-1} H_{ba} \end{bmatrix}$$

where $Q_i$, i=1, ..., M−1 are full-rank square matrices.

Theorem 7. For Construction 2, we have $$\min\{d_b, 2d_a\} \leq d \leq d_b,$$

$$d_i = d_a, \forall i,$$

$$r = r_b + (M-1)r_a.$$

Proof. To show the bounds on d, first note that for all i, $$\begin{bmatrix} H_a \\ Q_i H_{ba} \end{bmatrix}$$

is a parity-check matrix for $C_b$. Now, if a nonzero codeword of C has weights in only one minor code, then its weight must be at least $d_b$. If a nonzero codeword C has weights in m>1 minor codes, then its weight must be at least $md_a$. On the other hand, the minimum distance of C cannot be greater than $d_b$, since any minimum-weight codeword of $C_b$ followed by all zeros is a codeword in C.

To show $d_i = d_a$ for all i, it suffices to show $C_i = C_a$ for all i. Clearly, $C_i \subseteq C_i$. Note that $GF(q)^{n_1}$ is partitioned into $q^{r_b}$ cosets of $C_b$, corresponding to the $q^{r_b}$ $H_b$-syndromes. Out of these, those cosets whose corresponding $H_b$-syndromes start with $r_a$ zeros form a set partition of $C_a$. The above observation shows that there exist (an equal number of) codewords in $C_a$ corresponding to any $H_{ba}$-syndrome. As a consequence, for all $\underline{c} \in C_a$, and $i \neq j$, there exists $\underline{c}' \in C_a$, such that $\underline{c}' H_{ba}^T = \underline{c} H_{ba}^T Q_i^T (Q_j^T)^{-1}$. (We assume that $Q_0$ is the identity matrix for consistency.) Therefore, there exists a codeword in C whose projection to the i-th minor code is $\underline{c}$, to the j-th minor code $-\underline{c}'$, and zero to all other minor codes, which implies that $\underline{c} \in C_i$.

The claim about r follows directly from the construction.

Corollary 3. Construction 2 achieves (1) if and only if $d=d_b$ and $C_a$ and $C_b$ are both MDS codes.

In particular, if $d_b \leq 2d_a$, then Construction 2 achieves (1) as long as $C_a$ and $C_b$ are MDS. Recall that in this case, integrated interleaving (with B=1) can do as well.[b]

[b]In terms of minimum distance. Construction 2, when properly designed, will have a better weight distribution for correcting random errors.

On the other hand, if $d_b > 2d_a$, then $d \geq 2d_a$ (while note that for integrated interleaving, $d=2d_a$ in this case). But it is not clear how close Construction 2 can get to the bound. As starters, the following theorems give conditions on when and only when Construction 2 can achieve $d > 2d_a$.

Theorem 8. For Construction 2, if $d > 2d_a$, then $$MA_{d_a} < q^{r_b - r_a},$$

where $A_{d_a}$ is the number of minimum weight codewords in $C_a$, and $r_b$ and $r_a$ are the redundancy of $C_b$ and $C_a$, respectively.

Proof. Let $Q_0$ be the $(r_b - r_a) \times (r_b - r_a)$ identity matrix. Let $S_i = \{\underline{s} : \underline{s} = \underline{c} H_{ba}^T Q_i^T, \underline{c} \in C_a, \text{wt}(\underline{c}) = d_a\}$, i=0, ..., M−1. We note that $S_i \cap S_j = \emptyset$ for all $i \neq j$, for were it true that $\underline{c}_1 H_{ba}^T Q_i^T = \underline{c}_2 H_{ba}^T Q_j^T$ for some $\underline{c}_1, \underline{c}_2 \in C_a$, $wt(\underline{c}_1) = wt(\underline{c}_2) = d_a$, and $0 \leq i < j < M$, then $$\left( \underbrace{0, \ldots, 0}_{i}, \underline{c}_1, \underbrace{0, \ldots, 0}_{j-i-1}, -\underline{c}_2, 0, \ldots, 0 \right)$$

where each 0 is an all-zero $n_1$-row vector, would be a codeword in C with weight $2d_a$. Note also that by Theorem 7, $d_b > 2d_a$. Thus, all minimum-weight codewords of $C_a$ are correctable error patterns in $C_b$, so they must have distinct $H_b$-syndromes and hence distinct $H_{ba}$-syndromes. Therefore, $|S_0| = A_{d_a}$. Since $Q_i$'s are full-rank, we have $|S_i| = A_{d_a}$ for all i. The claim of the theorem then follows from the fact that $$\bigcup_{i=0}^{M-1} S_i \subset GF(q)^{r_b - r_a}.$$

Lemma 1. The number of n×n full-rank matrices over GF(q) is $$\prod_{i=0}^{n-1} (q^n - q^i).$$

Theorem 9. For Construction 2, there exist $Q_i$, $i=1, \ldots, M-1$, such that $d > 2d_a$, if $d_b > 2d_a$ and the following is satisfied:

$$(M-1) A_{d_a}^2 < q^\rho (q-1) \prod_{i=1}^{\rho} (1 - q^{-i}),$$

Where $A_{d_a}$ is the number of minimum-weight codewords in $C_a$, and $\rho = r_b - r_a$. Proof. For clarity, first consider the case where M=2. Since there is only $Q_1$, we drop the subscript and denote $Q = Q_1$. Let S be the set of $H_{ba}$-syndromes of all minimum weight codewords of $C_a$, i.e., $S = \{\underline{s}: \underline{s} = \underline{c} H_{ba}^T, \underline{c} \in C_a, wt(\underline{c}) = d_a\}$. Then $d > 2d_a$ if and only if $S \cap SQ^T = \emptyset$. Let $S' \subset S$ denote the set of syndromes whose first nonzero element is 1. Then due to linearity of the code, $S \cap SQ^T = \emptyset$ if and only if $S \cap S'Q^T = \emptyset$. For all $\underline{s} \in S'$ and $\underline{s} \in S$, let $\Omega_{\underline{s}',\underline{s}} = \{Q : \underline{s}' Q^T = \underline{s}\}$. If $|\cup_{\underline{s}' \in S', \underline{s} \in S} \Omega_{\underline{s}',\underline{s}}|$ is strictly less the number of full-rank $\rho \times \rho$ matrices, then we are done. Note that $|S| = A_{d_a}$ and $|S'| = A_{d_a}/(q-1)$, and for all $\underline{s}, \underline{s}'$, $|\Omega_{\underline{s}',\underline{s}}| = q^{\rho(\rho-1)}$, so by Lemma 1 and the union bound, a sufficient condition for the desired Q to exist is $$(q-1)^{-1} A_{d_a}^2 q^{\rho(\rho-1)} < \prod_{i=0}^{\rho-1} (q^\rho - q^i),$$

which is equivalent to $$A_{d_a}^2 < q^\rho (q-1) \prod_{i=1}^{\rho} (1 - q^{-i}).$$

For M>2, let $S_i = SQ_i^T$, $i=0, \ldots, M-1$, (as in previous proofs, assume $Q_0$ is the identity matrix). Let $S'_i$ denote the subset of $S_i$ whose first nonzero element is 1. Then we have $d > 2d_a$ if and only if $S'_i \cap S_j = \emptyset$ for all $i \neq j$, which is equivalent to that $S'_i \cap \cup_{j<i} S_j = \emptyset$ for all i. For all $\underline{s}' \in S'$ and $\underline{s} \in \cup_{j<i} S_j$, let $\Omega_{\underline{s}',\underline{s}}^{(i)} = \{Q : \underline{s}' Q^T = \underline{s}\}$. Denote $$\Omega^{(i)} = \bigcup_{\substack{\underline{s}' \in S' \\ \underline{s} \in \cup_{j<i} S_j}} \Omega_{\underline{s}',\underline{s}}^{(i)}$$

Then $d > 2d_a$ if and only if $Q_i \notin \Omega^{(i)}$, $i=1, \ldots, M-1$. Let $\Gamma_\rho$ be the set of all $\rho \times \rho$ matrices over GF(q) of full rank. Now, suppose $Q_i$'s are chosen according to a "greedy" algorithm, where we successively choose $Q_1 \in \Gamma_\rho \backslash \Omega^{(1)}$, $Q_2 \in \Gamma_\rho \backslash \Omega^{(2)}, \ldots, Q_{M-1} \in \Gamma_\rho \backslash \Omega^{(M-1)}$. This algorithm will succeed if $|\Gamma_\rho \backslash \Omega^{(i)}| > 0$ for all i, which is ensured if $|\Gamma_\rho \backslash \Omega^{(M-1)}| > 0$, since clearly $\Omega^{(j)} \subset \Omega^{(i)}$ for all $j < i$. Using the union bound, we have $$|\Gamma_\rho \backslash \Omega^{(M-1)}| \geq |\Gamma_\rho| - |S'| \cdot \left| \bigcup_{j < M-1} S_j \right| \cdot q^{\rho(\rho-1)} \geq \quad (3)$$

$$|\Gamma_\rho| - (q-1)^{-1} A_{d_a} \cdot (M-1) A_{d_a} \cdot q^{\rho(\rho-1)} =$$

$$\prod_{i=0}^{\rho-1} (q^\rho - q^i) - (M-1) A_{d_a}^2 (q-1)^{-1} q^{\rho(\rho-1)}$$

Setting the above expression to be positive gives a sufficient condition for the desired $Q_i$'s to exist and completes the proof.

Note that the above proof can also be done by using probabilistic methods, i.e., consider $Q_i$ as random matrices and show the expected amount of overlap amongst certain syndrome sets are small, hence the existence of at least one such matrix such that the corresponding syndrome sets will be disjoint. The result of Theorem 9 can be slightly improved by noticing multiple counting of certain matrices in applying the union bound to $$|\Omega^{(M-1)}| = \left| \bigcup_{\substack{\underline{s}' \in S' \\ \underline{s} \in \cup_{j<M-1} S_j}} \Omega_{\underline{s}',\underline{s}}^{(M-1)} \right|$$

Corollary 4. For Construction 2, there exist $Q_i$, $i=1, \ldots, M-1$, such that $d > 2d_a$, if $d_b > 2d_a$ and the following is satisfied:

$$\prod_{i=0}^{\rho-1} (q^\rho - q^i) > (M-1) \left( A_{d_a}^2 q^{\rho(\rho-1)} (q-1)^{-1} - A_{d_a} + q - 1 \right),$$

Where $A_i$ is the number of minimum-weight codewords in $C_a$, and $\rho = r_b - r_a$. Proof. Note that for all $0 \neq a \in GF(q)$ and $i=0, \ldots, M-2$, there are at least $|S'|$ pairs $(\underline{s}',\underline{s})$, $\underline{s}'\in S'$, $\underline{s}\in \cup_{j<M-1} S_j$, such that $\underline{s}=a Q_i \in \Omega_{\underline{s}',\underline{s}}^{(M-1)}$. Namely, for each $\underline{s}'\in S'$ and $\underline{s}=a\underline{s}'Q_i^T$. Therefore, when we appeal to the union bound in the final derivation in the proof of Theorem 9, there are $(q-1)(M-1)$ matrices each of which is counted $|S'|$ times. The claimed result is then shown by adding a correction term of $(q-1)(M-1)(|S'|-1)$ to expression (3) and following through.

Let us consider some examples. Suppose $M=2$, and $C_a$ is a [7,6,2] code over GF(8). The bounds of Theorem 8 and Theorem 9 imply that to get $d>4$ it is necessary that $\rho\geq 3$, and it is sufficient to have $\rho>3$. Through computer search, we find a code that for $\rho=3$ achieves $d=5$. It is easy to verify that in this case, the bound of (1) is achieved with equality. This results in a [14,9,5] code over GF(8). The parity-check matrix for this code is as follows:

$$H = \begin{bmatrix} H_a & & \\ & H_a & \\ H_{ba} & Q H_{ba} \end{bmatrix},$$

where $$H_a = [1\ 1\ 1\ 1\ 1\ 1\ 1],$$

$$H_{ba} = \begin{bmatrix} 1 & \alpha^1 & \alpha^2 & \alpha^3 & \alpha^4 & \alpha^5 & \alpha^6 \\ 1 & \alpha^2 & \alpha^4 & \alpha^6 & \alpha^8 & \alpha^{10} & \alpha^{12} \\ 1 & \alpha^3 & \alpha^6 & \alpha^9 & \alpha^{12} & \alpha^{15} & \alpha^{18} \end{bmatrix},$$

$$Q = \begin{bmatrix} 1 & 1 & 0 \\ 0 & 1 & 0 \\ 0 & 1 & 1 \end{bmatrix},$$

and $\alpha$ is a primitive root in GF(8), $\alpha^3+\alpha+1=0$.

As another example, let $M=2$ and $C_a$ be a [6,5,2] code over GF(8). We show here a code that achieves $d=6$ with $\rho=4$. This is a [12,6,6] code over GF(8) and its parity-check matrix for this code is as follows:

$$H = \begin{bmatrix} H_a & & \\ & H_a & \\ H_{ba} & Q H_{ba} \end{bmatrix},$$

where $$H_a = [1\ 1\ 1\ 1\ 1\ 1],$$

$$H_{ba} = \begin{bmatrix} 1 & \alpha^1 & \alpha^2 & \alpha^3 & \alpha^4 & \alpha^5 \\ 1 & \alpha^2 & \alpha^4 & \alpha^6 & \alpha^8 & \alpha^{10} \\ 1 & \alpha^3 & \alpha^6 & \alpha^9 & \alpha^{12} & \alpha^{15} \\ 1 & \alpha^4 & \alpha^8 & \alpha^{12} & \alpha^{16} & \alpha^{20} \end{bmatrix}$$

$$Q = \begin{bmatrix} 1 & 0 & 0 & 0 \\ 0 & \alpha^5 & 0 & 0 \\ 0 & 0 & \alpha^3 & 0 \\ 0 & 0 & 0 & \alpha^6 \end{bmatrix},$$

and $\alpha$ is a primitive root in GF(8), $\alpha^3+\alpha+1=0$.

Note that for the same length and distance parameters, Construction 1 would have required a larger field size for both the example codes we have shown.

A few further remarks on the code constructions in this section.

1) Consider a special case of Construction 1, using RS codes. Let $n=Mn_1$ and $H_b=[\alpha^{i(j-1)}]_{i=1,j=1}^{i=r_b,j=n}$, where $\alpha$ is a primitive root in GF(q), $q>n$. Then the code given by Construction 1 fits in Construction 2 as well, where all $Q_i$ have a diagonal form.

This is interesting because it shows the connection between Construction 1 and Construction 2. Moreover, such code can be decoded using an algorithm for decoding either class of codes.

2) In integrated interleaving, the design parameter B corresponds to the number of "bursty subblocks". If bursty errors are of concern to us, Construction 2 can be readily extended in the following way, in which case C is defined by the following parity-check matrix.

$$H = \begin{bmatrix} H_a & & & \\ & H_a & & \\ & & \ddots & \\ & & & H_a \\ & & & \Lambda \end{bmatrix}$$

where $$\Lambda = \begin{bmatrix} H_{ba} & Q_1 H_{ba} & \cdots & Q_{M-1} H_{ba} \\ H_{ba} & \alpha Q_1 H_{ba} & \cdots & \alpha^{M-1} Q_{M-1} H_{ba} \\ \vdots & \vdots & \vdots & \vdots \\ H_{ba} & \alpha^{B-1} Q_1 H_{ba} & \cdots & \alpha^{(M-1)(B-1)} Q_{M-1} H_{ba} \end{bmatrix}$$

3) Theorem 9 is non-constructive. It is an open question to systematically find good $Q_i$'s for Construction 2.

4) It turns out that Construction 2 fits in the general framework of Generalized Concatenated (GC) codes, or that of Generalized Error Location (GEL) codes, the two of which have been shown to be equivalent. Hence, in principle, most of the general results regarding these two classes of codes can be applied to Construction 2. Still, there are things that the general results do not provide for. For example, the decoding algorithms for these codes generally only decodes up to half the lower bound of the minimum distance. So it is not clear how we may take advantage of the fact when the minimum distance is higher (an example is for when $d>2d_a$). Also, in these frameworks, the idea is to build longer, stronger codes using smaller, simpler codes. There, whether the smaller codes would facilitate subline access or not is not of concern. In our case, the idea of local error detection and global error correction will have an impact on how these codes are used, esp. how they can be decoded.

The basic idea, like we already discussed in the motivation to coming up with Construction 2, is to have properly designed constraints on the syndromes that correspond to the $C_b$-cosets in $C_a$.

5) Construction 2 may be useful in constructing what is known as Almost-MDS (AMDS) codes. A code is Almost-MDS if its redundancy is equal to its minimum distance. For a given field size and minimum distance, people have found upper and lower bounds on the largest code length possible. In Construction 2, if M=2, $d_a$=2, both $C_a$ and $C_b$ are MDS, and d=$d_b$, then C will be an AMDS code. As an example, note that the [14,9,5] code over GF(8) we showed earlier is AMDS, and it can be lengthened in 4 steps to obtain a [18,13,5] code, whose parity-check matrix is given as follows:

$H_{18,13,5}$=[H|H'], where H is the parity-check matrix for the [14,9,5] code, and $$H' = \begin{bmatrix} 1 & 1 & 1 & 1 \\ 1 & 1 & 1 & 1 \\ 0 & 1 & 1 & 0 \\ 0 & 0 & 1 & 1 \\ 0 & 0 & 0 & 1 \end{bmatrix},$$

Decoding

Decoding is in principle two steps for subline access.
1. Error detection in $C_i$, and if errors are detected,
2. Error correction in C.

The first step is usually easy. A straightforward way is to check if the syndrome of the received subline is zero in the corresponding minor code. The complexity of such a check is very manageable. For the second step, brute force bounded distance decoding would involve a table lookup for all error patterns of length n and weight less than d/2. This may not be practical for complexity reasons. In addition, note that there may be error patterns that are easily correctable due to the subline structure of the code, but whose weights are d/2 or greater. For example, if each minor code has a minimum distance of 3, then any error pattern that involves at most one error in each subline can be easily corrected by decoding the sublines in their respective minor codes. On the other hand, such error patterns can have weights up to M, the number of sublines in a codeword, irrespective of d.

The above problems can be addressed partly by using a decoding algorithm that takes advantage of the subline structure of the code. For that, we consider the two constructions that have been proposed. Here, we assume that $C_a$ and $C_b$ are well structured codes with simple decoding algorithms (e.g. RS codes, Hamming codes, etc.).

For Construction 1, the second decoding step can be simplified by decoding the received word in $C_b$ instead of in C. This may incur some performance loss (as it really does not take advantage of the minor codes) but will likely have a complexity advantage. Another option is to use an algorithm similar to the one described below (for codes of Construction 2).

Now, consider Construction 2. First, let's see how we may decode a very specific code. Let C be the [14,9,5] code over GF(8) that we constructed in the previous section. Let $\underline{c}$ be the transmitted/stored codeword, which is received/read in error as $\underline{r}=\underline{c}+\underline{e}$. Or, denoting the first and last 7 symbols separately, we write $(\underline{r}_1,\underline{r}_2)=(\underline{c}_1,\underline{c}_2)+(\underline{e}_1,\underline{e}_2)$. If wt($\underline{e}$)≤2, then the following decoding algorithm is guaranteed to correct all errors. In the follows, all decoding are bounded distance decoding.

1. Let R:={i:$\underline{r}_i H_a^T \neq 0$}. Let $\underline{s}_i=\underline{r}_i H_{ba}^T$, i=1, 2.
2. If R is empty,
   (a) If $\underline{s}_1+\underline{s}_2 Q^T$=0, output $\hat{\underline{c}}=\underline{r}$, return.
   (b) If $\underline{s}_1+\underline{s}_2 Q^T \neq 0$,
      i. Let $\hat{\underline{s}}_1:=-\underline{s}_2 Q^T$. Decode $\underline{r}_1$ in the coset of $C_2$ with syndrome $(0,\hat{\underline{s}}_1)$. That is, solve $\hat{\underline{e}}_1 H_b^T=(0,\underline{s}_1-\hat{\underline{s}}_1)$ for $\hat{\underline{e}}_1$, such that wt($\hat{\underline{e}}_1$)≤2. If such $\hat{\underline{e}}_1$ is found, then let $\hat{\underline{c}}_1:=\underline{r}_1-\hat{\underline{e}}_1$, output $\hat{\underline{c}}=(\hat{\underline{c}}_1,\underline{r}_2)$, return.
      ii. If no such $\hat{\underline{e}}_1$ can be found, then let $\hat{\underline{s}}_2:=-\underline{s}_1 Q^{T^{-1}}$, and decode $\underline{r}_2$ in the coset of $C_b$ with syndrome $(0,\hat{\underline{s}}_2)$ If $\underline{r}_2$ is successfully decoded to $\hat{\underline{c}}_2$, then output $\hat{\underline{c}}=(\underline{r}_1,\hat{\underline{c}}_2)$, return. Otherwise, declare a decoding failure.
3. If |R|=1,
   (a) If R={1}, then let $\hat{\underline{s}}_1:=-\underline{s}_2 Q^T$ decode $\underline{r}_1$ in the coset of $C_b$ with syndrome $(0,\hat{\underline{s}}_1)$. If $\underline{r}_1$ is successfully decoded to $\hat{\underline{c}}_1$, then output $\hat{\underline{c}}=(\hat{\underline{c}}_1,\underline{r}_2)$, return. Otherwise, declare a decoding failure.
   (b) If R={2}, then let $\hat{\underline{s}}_2:=-\underline{s}_1 Q^{T^{-1}}$, and decode $\underline{r}_2$ in the coset of $C_b$ with syndrome $(0,\hat{\underline{s}}_2)$. If $\underline{r}_2$ is successfully decoded to $\hat{\underline{c}}_2$, then output $\hat{\underline{c}}=(\underline{r}_1,\hat{\underline{c}}_2)$, return. Otherwise, declare a decoding failure.
4. If R={1,2}, then
   (a) Let $\epsilon_i:=\underline{r}_i H_a^T$, i=1,2. For j=1, ..., 7, calculate $\underline{t}_j=(t_{j,1},t_{j,2},t_{j,3}):=\underline{s}_2-\epsilon_2 \underline{h}_j$, where $\underline{h}_j$ is the j-th row of $H_{ba}^T Q^T$.
   (b) Find j* such that $t_{j*,2}/t_{j*,1}=t_{j*,3}/t_{j*,2}$. Let k*=$\log_\alpha(t_{j*,2}/t_{j*,1})$. If no such j* exists, declare a decoding failure.
   (c) Let $\underline{u}_j$ denote the (length-7) unit vector whose elements are all zeros except the j-th being a one. Let $\hat{\underline{c}}_1=\underline{r}_1-\epsilon_1 \underline{u}_{k*}$, and $\hat{\underline{c}}_2=\underline{r}_2-\epsilon_2 \underline{u}_{j*}$. Output $\hat{\underline{c}}=(\hat{\underline{c}}_1,\hat{\underline{c}}_2)$. Return.

A major part of the above algorithm can be generalized to all codes of Construction 2. The algorithm is given as follows and bears resemblance to the decoding algorithm used for intergrated interleaving schemes. In the algorithm, the "syndrome constraint" refers to the fact that for all $\underline{c}=(\underline{c}_0,\ldots,\underline{c}_{M-1})\in C$, we have $\Sigma_{i=0}^{M-1}\underline{s}_i Q_i^T=0$, where $\underline{s}_i=\underline{c}_i H_{ba}^T$ is the $H_{ba}$-syndrome for subline i.

1. Decode each subline in $C_a$. Record the number of errors corrected for subline i as $\tau_i$. $\tau_i=\infty$ if decoding failed for subline i.
2. If there are more than one i such that $\tau_i=\infty$, declare a decoding failure.
3. If there is exactly one i such that $\tau_i=\infty$, then assuming all other sublines are correctly decoded, solve for the $H_{ba}$-syndrome of subline i using the syndrome constraint, and decode $\underline{r}_i$ in the corresponding coset of $C_b$. If successful, return; otherwise, declare decoding failure.
4. If for all i, $\tau_i<\infty$, then check if the syndrome constraint is satisfied. If it is, accept the outputs from subline decoders and return. Otherwise, sort $\{\tau_i\}$ as $\{\tau_{i_j}\}_{1\leq j\leq M}$, such that $\tau_{i_1}\geq\tau_{i_2}\ldots\geq\tau_{i_M}$. For j=1 to M, assume that the $H_{ba}$-syndrome for subline $i_j$ is erasure and solve for it using the syndrome constraint. Assuming this $H_{ba}$-syndrome for subline $i_j$, decode $\underline{r}_{i_j}$ in the corresponding coset; if successful, break and return. If the above procedure fails for all j, declare a decoding failure.

Theorem 10. Let $t_i$ denote the number of errors occurred in subline i, i=1, ..., M. Let $E_a=\{i:t_i \geq d_a/2\}$. The above algorithm corrects all error patterns such that 1. $E_a = \emptyset$, or
2. $E_a = \{i\}$, $t_i < d_b/2$, and $$\sum_j t_j + \max_{j \neq i} t_j < d - \frac{d_b - 1}{2}.$$

Proof. If $E_a = \emptyset$, then all sublines will be corrected and decoding will be successful. If $E_a = \{i\}$ and $\tau_i = \infty$, then all sublines except the i-th one will be correctly decoded. The $H_{ba}$-syndrome for subline i is thus correctly inferred and the $t_i$ errors will be corrected since $t_i < d_b/2$. Finally, if $E_a = \{i\}$ but $\tau_i < \infty$ for all i, suppose when assuming the $H_{ba}$-syndrome for subline j is erasure the decoding algorithm miscorrects the received word to a codeword other than the original one. By the way the algorithm works, this only happens when $\tau_i \leq \tau_j = t_j$. Let $\tau'_j$ denote the number of "errors" found when subline j is miscorrected in the last step when it is decoded in a coset of $C_b$. We note that the Hamming distance between the correct codeword and the miscorrected output is at most $$\sum_l t_l + \tau_i + \tau'_j \leq \sum_l t_l + t_j + \frac{d_b - 1}{2} \leq \sum_l t_l + \max_{l \neq i} t_l + \frac{d_b - 1}{2} < d$$

which is a contradiction.

We remark that with appropriate modifications the above algorithm can also be used to decode codes of Construction 1.

Finally, note that depending on the requirements of the system to which the code is to be applied, the two-step decoding principle that we started with at the beginning of this section may be generalized in such a way that in the first step, instead of pure error detection, a combination of error correction and error detection is performed. For example, one may use the minor code alone to correct the retrieved subline up to a certain (small) number of errors, and the line code will only be invoked for further error correction if more than that many errors are detected in the subline. Such modified decoding principle will generally trade off some reliability for the benefits of less falling back on decoding the full line. Depending on particular system scenarios, this may be a reasonable thing to do.

While the invention has been described in terms of a single preferred embodiment, those skilled in the art will recognize that the invention can be practiced with modification within the spirit and scope of the appended claims. For example, while the invention has been described in terms of memories using dynamic random access memory (DRAM) devices, those skilled in the art will recognize that the invention can be practiced using other and different memory technology. Further, the description of the invention has been in the context of the redundant symbols stored together with and/or within each line of data, but this is not necessary for the practice of the invention. Some or all of the redundant symbols may be stored in a special purpose memory distinct from the memory that stores the sublines of data. For example, the shared redundancy might be stored using static random access memory (SRAM) technology. Moreover, the invention is not limited to applications to main memories but may be advantageously applied to storage medium incorporated on a processor chip having one or more processor cores.

Having thus described our invention, what we claim as new and desire to secure by Letters Patent is as follows:

1. A method of error control for memories permitting subline accesses comprising the steps of:
   dividing a line of data into a plurality of sublines of data in memory, wherein a line of data is a first level of access granularity and a subline of data is a second level of access granularity smaller than said first level of access granularity;
   adding a first level of code to each of said plurality of subtitles of data, said first level of code providing local protection for each of said plurality of sublines of data;
   adding a second level of code to the line of data, said second level of code providing global protection for said plurality of sublines of data;
   retrieving one or more subtitles of data, wherein accessed sublines of data may be in different lines of data and multiple subtitles may be concurrently retrieved;
   detecting errors in sublines of data using said first level of code; and
   correcting errors in sublines of data by accessing a line of data containing subtitles of data having detected errors and using said second level of code.

2. The method of error control for memories as recited in claim 1, wherein the step of detecting errors further includes the step of correcting errors using the first level of code, and wherein the step of correcting errors using the second level of code is restricted to correction of those errors that have not been corrected using the first level of code.

3. The method of error control for memories as recited in claim 1, further comprising the steps of:
   computing updated redundant information that a subline shares with other sublines of a line of data resulting from a change in content of the subline of data, said computing being based on the difference between old and new values of the subline;
   computing updated redundant information that is private to a subline, if needed; and
   writing to memory all updated redundant information and new content of the subtitle of data.

4. The method of error control for memories recited in claim 1, further comprising the step of storing the shared redundant information with said plurality of subtitles of data in a same memory location.

5. The method of error control for memories recited in claim 1, further comprising the step of storing the shared redundant information in a different memory location from said plurality of subtitles of data.

6. The method of error control for memories recited in claim 1, wherein the shared redundant information can be accessed independently of any other information in memory.

7. The method of error control for memories recited in claim 1, further comprising a memory scrubbing method comprising the steps of:
   reading an entire line with associated redundant information;
   detecting and correcting errors with both the first and second level error control codes; and
   storing back the entire line with its associated redundant information.

8. The method of error control for memories recited in claim 1, wherein the local protection for each subline of data is obtained using a code with minimum distance $d_{local}$, the global protection for the sublines of data is obtained using a code with mimimum distance $d_{global}$, and the minimum distance $d_{global}$ is more than twice as large as the minimum distanced $d_{local}$.

9. A method of error control for memories permitting subline accesses comprising the steps of:
- dividing a line of data into a plurality of sublines of data in memory;
- adding a first level of code to each of said plurality of sublines of data, said first level of code providing local protection for each of said plurality of sublines of data;
- adding a second level of code to the line of data, said second level of code providing global protection for said plurality of sublines of data;
- retrieving one or more sublines of data, wherein accessed sublines of data may be in different lines of data and multiple sublines may be concurrently retrieved;
- detecting errors in sublines of data using said first level of code; and
- correcting errors in sublines of data using said second level of code,
- wherein the step of dividing a line of data results in M sublines, the local protection of the i-th subline is attained by a code with parity check matrix $H_a^{(i)}$, the global protection for all of the sublines is attained by a code with parity check matrix $$H = \begin{bmatrix} H_a^{(1)} & & & \\ & H_a^{(2)} & & \\ & & \ddots & \\ & & & H_a^{(M)} \\ H_{ba} & & & \end{bmatrix}.$$

10. The method of error control code for memories recited in claim 9, wherein the matrices $H_a^{(1)}, \ldots, H_a^{(M)}$ and $H_{ba}$ are selected so that the parity check matrix $H_{MDS}$ given by $$H_{MDS} = \begin{bmatrix} H_a^{(1)} & H_a^{(2)} & \cdots & H_a^{(M)} \\ & & H_{ba} & \end{bmatrix}$$

is the parity check matrix of a maximum distance separable code.

11. A method of error control for memories permitting subline accesses comprising the steps of:
- dividing a line of data into a plurality of sublines of data in memory;
- adding a first level of code to each of said plurality of sublines of data, said first level of code providing local protection for each of said plurality of subtitles of data;
- adding a second level of code to the line of data, said second level of code providing global protection for said plurality of sublines of data;
- retrieving one or more sublines of data, wherein accessed sublines of data may be indifferent lines of data and multiple sublines may be concurrently retrieved;
- detecting errors in sublines of data using said first level of code; and
- correcting errors in sublines of data using said second level of code,
- wherein the step of dividing a line of data results in M sublines of data, the local protection of every subline of data is attained by a code with the parity check matrix $H_a$, and the global protection of the sublines of data is attained by a code with the parity check matrix $$H = \begin{bmatrix} H_a & & & & \\ & H_a & & & \\ & & \ddots & & \\ & & & H_a & \\ H_{ba} & Q_1 H_{ba} & \cdots & Q_{M-1} H_{ba} \end{bmatrix},$$

where $Q_i$, $i=1, \ldots, M-1$, are selected to be distinct, full-rank square matrices.

12. A memory system having a plurality lines of data, each composed of sublines of data protected using first and second level codes, comprising:
- access means for reading one or more sublines of data from memory along with redundant information for each accessed subline of data, wherein accessed sublines of data may be in different lines of data and multiple sublines may be concurrently accessed, and wherein a line of data is a first level of access granularity and a subline of data is a second level of access granularity smaller than said first level of access granularity;
- error detecting means for detecting whether there is an error in a subline of data read from memory, and means responsive to an error detected by said error detecting means for reading additional sublines of data in the line of data together with shared redundant information; and
- error correcting means for attempting to correct an error detected by said detecting means by accessing a line of data containing sublines of data having detected errors and using the private and shared redundant information as well as a value of the line read and reporting any errors detected and whether the errors are correctable or not.

13. The memory system as recited in claim 12, further comprising memory subline writing means, whereby a subline write results in changing the content of the subline in memory and updating shared redundant information and whereby the updating of the shared redundant information is accomplished without reading other memory sublines.

14. The memory system recited in claim 12, further comprising memory subline read-modify-write operation means, whereby a subline read-modify-write operation results in reading and writing the subline in memory and additionally updating shared redundant information and whereby the updating of the shared redundant information is accomplished without reading other memory sublines.

15. The memory system recited in claim 12, wherein the shared redundancy is stored in a special purpose memory distinct from the memory that stores the sublines of data.

16. The memory system recited in claim 15, wherein the special purpose memory is constructed using static random access memory (SRAM) technology.

17. The memory system recited in claim 12, wherein the memory is constructed using dynamic random access memory (DRAM) devices.

18. The memory system recited in claim 12, wherein the memory is used as a storage medium for a processor chip with at least one processor core.

19. A computer readable medium having recorded code which implements a method of error control for memories permitting subline accesses, said method comprising the steps of:
- dividing a line of data into a plurality of sublines of data in memory, wherein a line of data is a first level of access granularity and a subline of data is a second level of access granularity smaller than said first level of access granularity;

adding a first level of code to each of said plurality of sublines of data, said first level of code providing local protection for each of said plurality of sublines of data;

adding a second level of code to the line of data, said second level of code providing global protection for said plurality of sublines of data;

retrieving one or more sublines of data, wherein accessed sublines of data may be in different lines of data and multiple sublines may be concurrently retrieved;

detecting errors in sublines of data using said first level of code; and correcting errors in sublines of data by accessing a line of data containing sublines of data having detected errors and using said second level of code.

20. The computer readable medium recited in claim 19, wherein the recorded code that implements the step of detecting errors further includes code that implements the step of correcting errors using the first level of code, and wherein the code that implements the step of correcting errors using the second level of code restricts correction to those errors that have not been corrected using the first level of code.

* * * * *